(12) United States Patent
Kasper et al.

(10) Patent No.: US 7,062,816 B2
(45) Date of Patent: Jun. 20, 2006

(54) SURFACE CLEANER WITH POWER DRIVE

(75) Inventors: Gary A. Kasper, Grand Rapids, MI (US); Allen W. Scott, Grand Rapids, MI (US); Phong Hoang Tran, Caledonia, MI (US); David E. McDowell, Grand Rapids, MI (US); Gary L. Smith, Belding, MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 319 days.

(21) Appl. No.: 10/064,723

(22) Filed: Aug. 9, 2002

(65) Prior Publication Data

US 2002/0174507 A1 Nov. 28, 2002

Related U.S. Application Data

(63) Continuation-in-part of application No. 09/593,126, filed on Jun. 13, 2000, now Pat. No. 6,446,302.

(60) Provisional application No. 60/346,575, filed on Jan. 7, 2002, provisional application No. 60/139,127, filed on Jun. 14, 1999.

(51) Int. Cl.
*A47L 5/00* (2006.01)

(52) U.S. Cl. ............... 15/340.2; 15/410; 15/320; 15/340.3

(58) Field of Classification Search .......... 15/320, 15/340.1, 340.2, 410, 387, 340.3, 340.4
See application file for complete search history.

(56) References Cited

U.S. PATENT DOCUMENTS

| | | | |
|---|---|---|---|
| 1,459,946 A * | 6/1923 | Camarata et al. .......... 15/340.2 |
| 1,465,285 A | 8/1923 | Peterson | |
| D152,182 S * | 12/1948 | Barnhart .................... 15/410 |
| 2,814,063 A * | 11/1957 | Ripple ..................... 15/340.2 |
| 2,950,772 A | 8/1960 | Dostal et al. | |
| 3,061,858 A | 11/1962 | Dostal et al. | |
| 3,220,043 A | 11/1965 | Lampe | |
| 3,350,960 A * | 11/1967 | Lamburn et al. .......... 475/207 |
| 3,402,420 A | 9/1968 | Schaeffer | |
| 3,618,687 A | 11/1971 | Ripple | |
| 3,854,164 A | 12/1974 | Schmitz ..................... 15/377 |
| 3,938,216 A | 2/1976 | Schmitz et al. | |
| 4,167,799 A | 9/1979 | Webb ........................ 15/320 |
| 4,196,492 A | 4/1980 | Johnson et al. ............. 15/320 |
| 4,249,281 A | 2/1981 | Meyer et al. | |
| 4,342,369 A | 8/1982 | Ransom | |
| 4,347,643 A | 9/1982 | Bair, III | |
| 4,434,865 A | 3/1984 | Tschudy et al. | |
| 4,513,469 A | 4/1985 | Godfrey et al. | |
| 4,615,071 A | 10/1986 | Frohbieter | |

(Continued)

*Primary Examiner*—Theresa T. Snider
(74) *Attorney, Agent, or Firm*—McGarry Bair, PC

(57) ABSTRACT

A portable surface cleaning apparatus comprises a fluid dispensing system including at least one fluid supply tank, a dispensing nozzle connected to the fluid supply tank through a fluid supply conduit for applying a cleaning fluid to a surface to be cleaned, a fluid recovery tank for holding recovered fluid, a suction nozzle, a working air conduit extending between the recovery tank and the suction nozzle, a vacuum source in fluid communication with the recovery tank for generating a flow of working air from the suction nozzle through the working air conduit and to the recovery tank to thereby recover fluid from the surface to be cleaned through the suction nozzle and working air conduit and into the recovery tank, and a power drive mechanism for selectively propelling the portable cleaning apparatus over the surface to be cleaned

41 Claims, 20 Drawing Sheets

U.S. PATENT DOCUMENTS

| | | |
|---|---|---|
| 4,624,027 A | 11/1986 | Martin .................... 15/410 |
| 4,754,520 A | 7/1988 | Steadings et al. ........... 15/319 |
| 4,766,640 A | 8/1988 | Martin et al. |
| 4,845,803 A | 7/1989 | King ..................... 15/339 |
| 5,064,010 A | 11/1991 | Masbruch et al. ........... 180/6.5 |
| 5,115,537 A | 5/1992 | Meyer et al. .............. 15/340.2 |
| 5,187,832 A | 2/1993 | Meyer et al. .............. 15/329 |
| 5,237,720 A | 8/1993 | Blase et al. ............... 15/321 |
| 5,261,141 A | 11/1993 | La Boda .................. 15/52.1 |
| 5,285,550 A | 2/1994 | Meyer et al. .............. 15/328 |
| 5,323,483 A | 6/1994 | Baeg ..................... 15/319 |
| 5,335,740 A | 8/1994 | Meyer et al. .............. 180/19.1 |
| 5,339,916 A | 8/1994 | Louis ..................... 15/340.2 |
| 5,406,674 A | 4/1995 | Lawter et al. .............. 15/340.2 |
| 5,504,971 A | 4/1996 | McCormick ............... 15/340.2 |
| 5,539,953 A | 7/1996 | Kurz ..................... 15/367 |
| 5,608,944 A | 3/1997 | Gordon ................... 15/319 |
| 5,613,261 A | 3/1997 | Kawakami et al. ........... 15/319 |
| 5,797,163 A | 8/1998 | Whitaker et al. ............ 15/320 |
| 5,815,884 A | 10/1998 | Imamura et al. ............ 15/339 |
| 5,839,156 A | 11/1998 | Park et al. ................ 15/339 |
| 5,841,259 A | 11/1998 | Kim et al. ................ 15/340.1 |
| 5,867,861 A | 2/1999 | Kasen et al. ............... 15/320 |
| 5,937,475 A | 8/1999 | Kasen et al. ............... 15/320 |
| 5,983,442 A * | 11/1999 | Louis et al. ............... 15/320 |
| 5,987,696 A | 11/1999 | Wang ..................... 15/319 |
| 6,055,702 A | 5/2000 | Imamura et al. ............ 15/339 |
| 6,061,869 A | 5/2000 | Ettes et al. ............... 15/340.2 |
| 6,108,862 A | 8/2000 | Frederick et al. ........... 15/340.2 |
| 6,167,587 B1 | 1/2001 | Kasper et al. .............. 15/320 |
| 6,176,940 B1 | 1/2001 | Wang ..................... 134/21 |
| 6,282,747 B1 | 9/2001 | Morgan et al. ............. 15/340.2 |
| 2004/0134019 A1* | 7/2004 | Cipolla et al. ............. 15/340.2 |

* cited by examiner

SURFACE CLEANER WITH POWER DRIVE

CROSS REFERENCE TO RELATED APPLICATIONS

This claims the benefit of U.S. provisional patent application Ser. No. 60/346,575, filed Jan. 7, 2002, entitled EXTRACTION CLEANER WiTH POWER DRIVE, and is a continuation-in-part of U.S. patent application Ser. No. 09/593,126, filed Jun. 13, 2000, entitled EXTRACTION CLEANTNG MACHINE WITH CLEANING CONTROL, now U.S. Pat. No. 6,446,302, which claims the benefit of U.S. Provisional Patent Application Ser. No. 60/139,127, filed Jun. 14, 1999.

BACKGROUND OF INVENTION

1. Field of the Invention

The invention relates to floor cleaning extractors. In one of its aspects, it relates to an upright extraction cleaner with a power drive assembly to move the cleaner across a floor surface to be cleaned. In another of its aspects, the invention relates to an upright extraction cleaner with a reversible power drive assembly for movement backward and forward. In yet another of its aspects, the invention relates to an upright extraction cleaner with a power drive assembly that is operated by a push-pull handle for forward and reverse movement over a floor to be cleaned. In still another of its aspects, the invention relates to an upright extraction cleaner with a reversible power drive assembly that can be locked in a neutral position.

2. Description of the Related Art

Upright extraction cleaners include a handle pivotally mounted to a base housing, a solution dispensing system and a solution recovery system. Such an upright extraction cleaner is disclosed in commonly owned U.S. Pat. No. 6,131,237. The disclosed upright extraction cleaner includes a suction nozzle in the base and an agitation brush in the suction nozzle, the suction nozzle being fluidly connected to a suction source and a recovery tank. Soil-bearing solution from a surface being cleaned is transported to the recovery tank.

U.S. Pat. No. 5,335,740 discloses a power-driven upright vacuum cleaner having a base housing and a pivotally mounted upright handle.

Upright extraction cleaners generally tend to be larger and heavier than upright vacuum cleaners, particularly when in use and the solution dispensing system is charged with a cleaning solution for application to a surface. Upright extraction cleaners are also known to have an optimal operating speed for dispensing and, particularly, extracting cleaning solution from a surface being cleaned, as disclosed in U.S. patent application Ser. No. 09/593,126, filed Jun. 13, 2000, and entitled EXTRACTION CLEANING MACHINE WITH CLEANING CONTROL now U.S. Pat. No. 6,446, 302. A power drive system can be used in conjunction with the disclosed cleaning control system, although upright extraction cleaners having a pivotally mounted upright handle are not known to be equipped with a power drive system.

It would be advantageous to provide an upright extraction cleaner with a power drive system for assisting the user in transporting the weight of the extraction cleaner over the surface being cleaned at an optimized speed for applying and recovering a cleaning solution from the surface.

SUMMARY OF INVENTION

An upright extraction cleaner includes a base housing, an upright handle pivotally mounted to the base housing, a solution dispensing system for applying a cleaning solution to a surface being cleaned and a recovery system for recovering the solution from the surface, at least one wheel for supporting the extraction cleaner on the surface, and a power drive system for selectively propelling the extraction cleaner in either a forward or reverse direction along the surface.

According to the invention, an extraction surface cleaning apparatus comprises a housing including a base and an upright handle pivotally mounted to the base for manipulation of the base along a surface to be cleaned, a liquid dispensing system mounted to the housing for applying liquid to the surface to be cleaned, a fluid recovery system mounted to the housing for recovering and holding soiled fluid from the surface to be cleaned, a traction driver mounted to the base for supporting the housing for movement along the surface to be cleaned, and a power drive assembly mounted to the housing and connected to the traction driver for selectively propelling the base over the surface to be cleaned.

In one embodiment, the power drive assembly includes a drive motor selectively coupled to the traction driver for selectively driving the traction driver in at least one direction and a drive actuator on the handle operably connected to the drive motor for controlling the selective driving of the traction driver by the drive motor. In a one embodiment, the drive motor comprises a reversible electric motor. In another embodiment, the drive motor comprises an electric motor and the power drive assembly further comprises a transmission assembly operably connected between the electric motor and the traction driver to selectively drive the traction driver in two directions.

In a preferred embodiment of the invention, the upright handle has an upper end portion and the drive actuator comprises a handle grip slidably mounted on the upper end portion of the handle for axial movement along the handle between forward and rearward positions. Further, a cable is connected between a handle grip and the clutch.

In an alternative embodiment, the transmission assembly comprises a flywheel mounted for rotation about a central axis having a pair of parallel radial surfaces. The traction driver is non-rotatably mounted on a drive axle and the drive axle is mounted for rotation about an axis parallel and adjacent to one of the flywheel radial surfaces. A drive wheel is axially shiftable and non-rotatably mounted on the drive axle for rotation therewith, and the drive wheel has an outer circumferential surface that rolls along one of the radial surfaces of the fly wheel to transfer rotary motion of the fly wheel to rotary motion of the drive axle. Thus, shifting of the drive wheel along the drive axle changes the gear ratio between the flywheel and the drive wheel. A projection of the drive axle onto the one radial surface of the flywheel defines a diametrical line across the flywheel and the drive wheel contact with the flywheel is along the diametrical line, whereby axial shifting of the drive wheel along the drive axle changes the gear ratio and can also change the direction of rotation of the drive axle. A worm gear is driven by the motor and the flywheel has an outer circumferential gear edge that is driven by the worm gear.

In another embodiment, the power drive assembly includes an air drive turbine motor.

In a further embodiment, the power drive assembly further includes a belt between the transmission assembly and the traction driver. A belt tensioner assembly mounted to the housing to maintain tension on the belt. The belt tensioner assembly comprises a plate slidably mounted to the housing, a pair of wheels rotatably mounted on the plate and the belt is weaved between the wheels so that proper tension is maintained when the belt is driven in either direction.

In yet another embodiment of the invention, the power drive assembly comprises a drive motor mounted on the housing and a flexible cable in driving relationship at one end with the motor and in driving relationship at the other end with the traction driver.

In still another embodiment of the invention, the power drive assembly comprises a wheel sprocket non-rotatably connected to the traction driver for movement therewith, a drive motor mounted on the housing in driving relationship with the wheel sprocket. In this embodiment, the drive motor is mounted to the handle and a belt is operably connected to the drive motor and the wheel sprocket for driving the traction driver.

In still another embodiment of the invention, the traction driver comprises a drive brush mounted for rotation about a horizontal axis on the base and the power drive assembly comprises a sprocket non-rotatably mounted to the drive brush, a drive motor mounted to the housing, and a belt drive between the motor and the wheel sprocket for driving the drive brush. In this embodiment, rotation of the drive brush results in movement of the base across the surface to be cleaned.

In still another embodiment of the invention, the traction driver comprises a track assembly including a pair of track sprockets mounted on the base for rotation about parallel, horizontally spaced axes, at least one track belt reeved around the track sprocket and in contact with a surface to be cleaned, and a drive motor mounted on the housing and operably connected to one of the track sprockets for selectively driving the same.

In still another embodiment of the invention, the power drive assembly comprises a drive actuator on the handle for selectively controlling the movement of the base over the surface to be cleaned. In this embodiment, the drive actuator is adapted to control the forward and reverse movement of the base over the surface to be cleaned. Further, the upright handle has an upper end portion and the drive actuator comprises a handle grip slidably mounted on the upper end portion of the handle for axial movement along the handle between forward and rearward positions. The drive actuator is biased to a neutral position between the forward and rearward positions for disablement of the power drive assembly. Further, the drive actuator has a mounting block slidable on the handle and further comprising a solution valve mechanism in the fluid supply conduit mounted to the sliding block for movement therewith. A solution valve actuator is mounted to the handle grip and connected to the solution valve mechanism to control the flow of cleaning solution through the solution valve mechanism to the liquid dispenser from the solution chamber.

In a preferred embodiment of the invention, a lock selectively locks the handle grip in the neutral position. The lock comprises an aperture in the handle grip and an aperture in the upper portion of the handle and apertures aligned with each other when the handle grip is in a neutral position, and a pin is selectively moveable between a locked position wherein the pin is positioned within both of the apertures and an unlocked position wherein the pin is retracted from at least one of the two apertures.

In still another embodiment of the invention, a carry handle affixed to the upright handle.

In still another embodiment of the invention, at least two wheels are mounted to the base for supporting the housing for movement over the surface to be cleaned and the traction driver comprises at least one of the at least two wheels.

DETAILED DESCRIPTION

Figure 1:
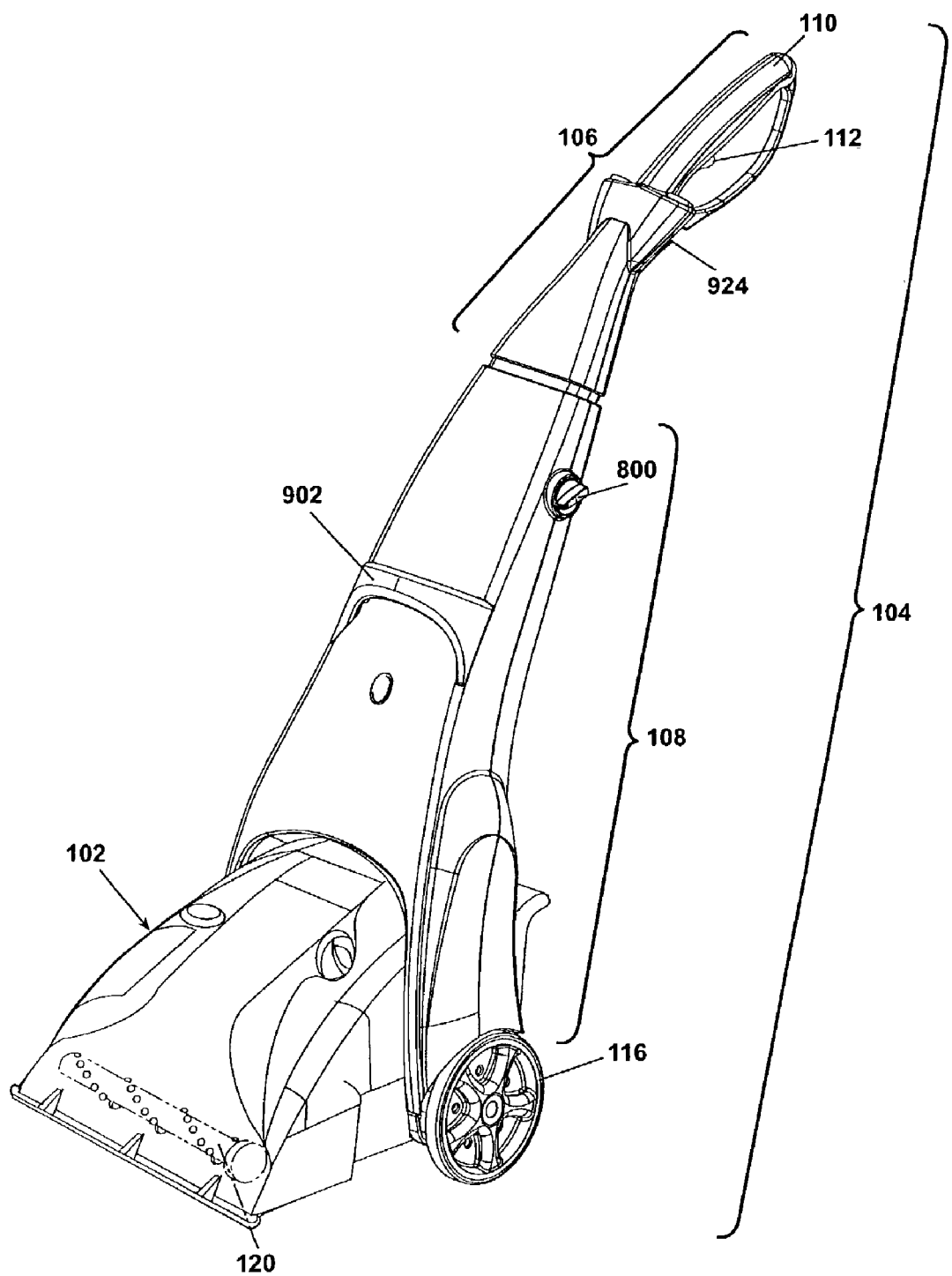
FIG. 1 is a perspective view of an extraction cleaner with power drive according to the invention.
Figure 1A:
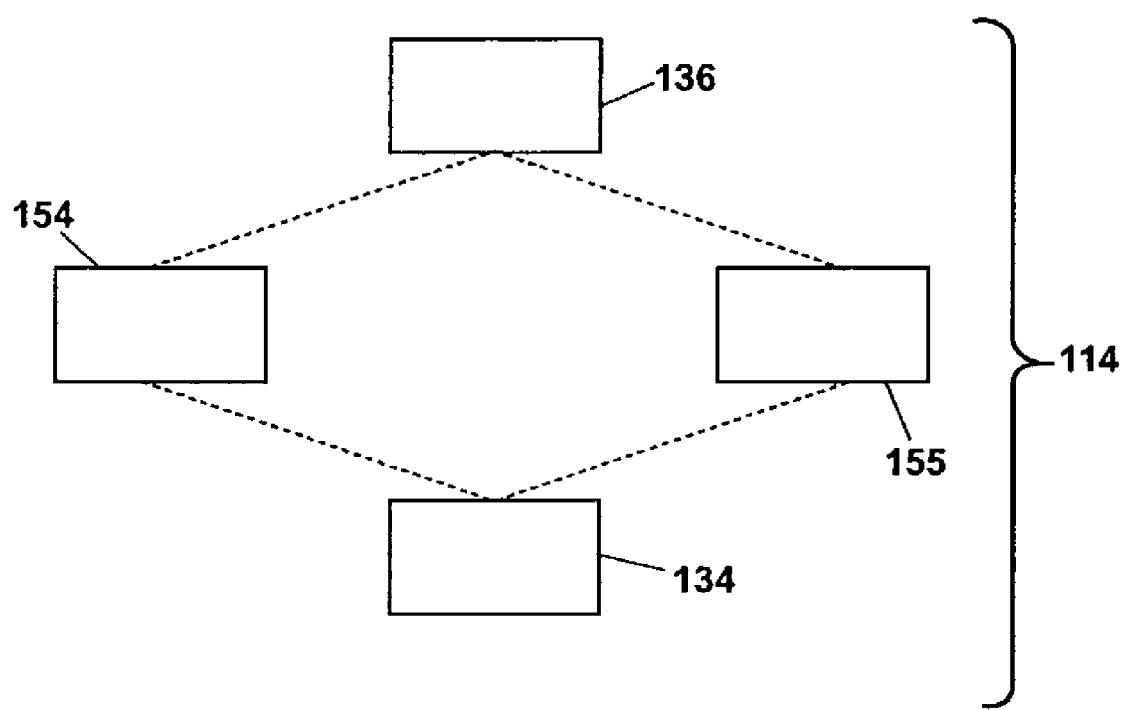

Referring now to the drawings and to FIG. 1 in particular, an upright extraction cleaning machine has a power drive assembly 114 for selectively propelling the extraction cleaning machine in at least one direction under the control of the user. Referring to FIG. 1A, the power drive assembly 114 in an upright deep cleaning machine comprises the block elements of a drive motor 154, a transmission assembly 155, a traction drive 134 and a drive actuator 136. As more fully described herein, these block elements can be utilized in different combinations to achieve selective motion of the cleaning machine across the surface.

Referring to FIGS. 1–4, the upright extraction cleaning machine comprises a base housing 102 and an upright handle assembly 104. The upright handle assembly 104 is pivotally mounted to the base housing 102 and comprises an upper portion 106 and a lower portion 108. The upper portion 106 is formed of a front shell 900 and a rear shell 950 and includes a handle grip 110 and a solution trigger assembly 112. The lower handle portion is formed of a front shell 122 and a rear shell 124. The handle upper portion 106 is slidably connected to the handle lower portion 108 through a telescoping connection and a sliding block assembly 130 located in the handle lower portion 108. The front shell 122 and rear shell 124 define side extension cavity 118 for enclosing internal components including the power drive elements. A carrying handle 902 is attached to the lower portion 108 front shell 122 by two screws or other suitable fastening method.

The base housing 102 is supported on a floor surface by a pair of wheels 116 that are rotationally mounted to the handle lower portion 108 through stub axles 702. The handle lower portion 108 has bearings that are journaled in sockets in the base housing 102 for pivotal mounting of the handle on the base housing 103. A rotatable agitation brush 120 is rotationally mounted to the base housing 102 and extends beneath a lower surface thereof for contact with the surface being cleaned. Further details of the upright extraction cleaner, with specific reference to the base housing 102, are disclosed in U.S. Pat. Nos. 6,167,587 and 6,131,237, which are incorporated herein by reference in their entirety.

Figure 2:
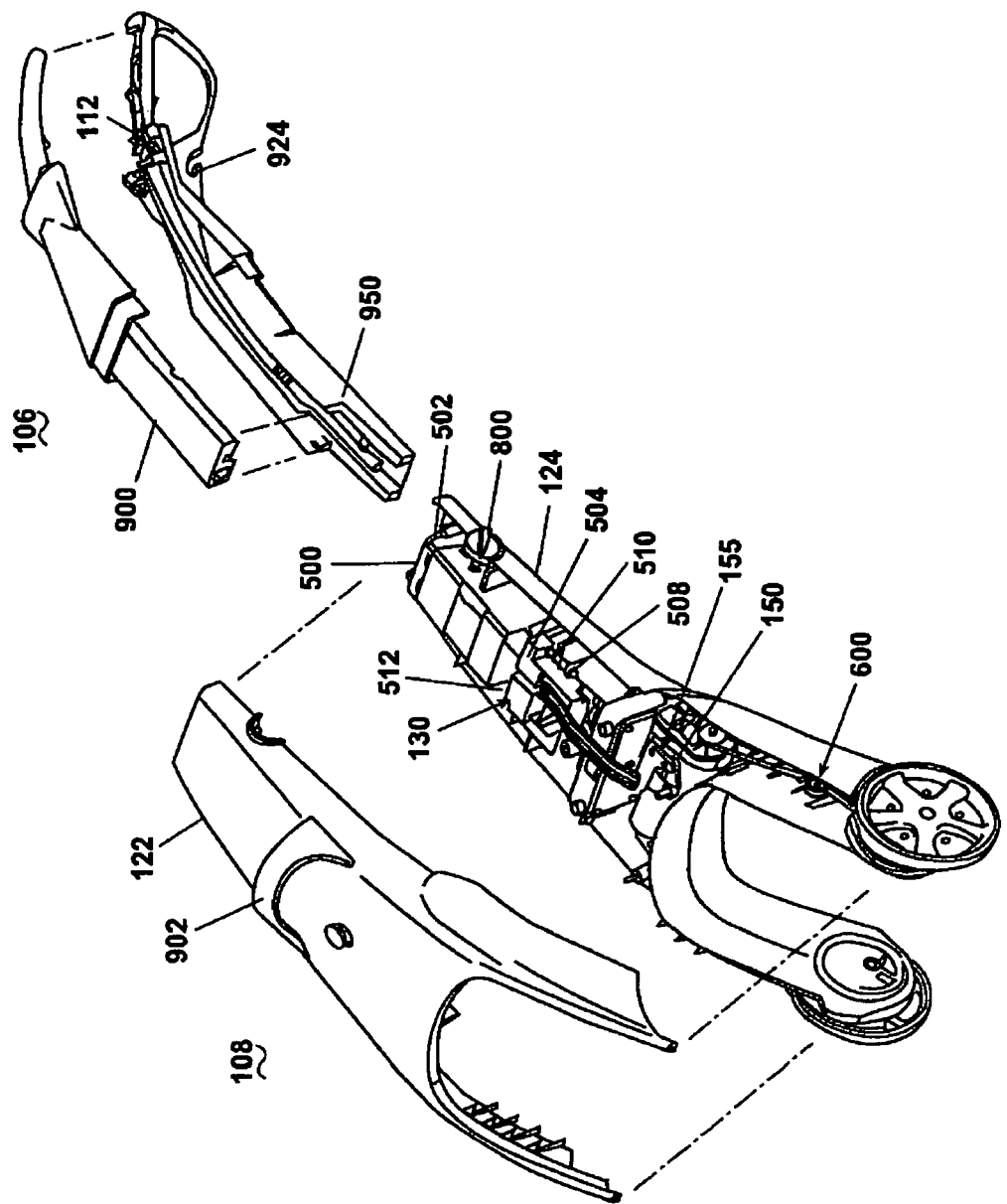
FIG. 2 is an exploded perspective view of the upright handle of the extraction cleaner of FIG. 1.
Figure 3:
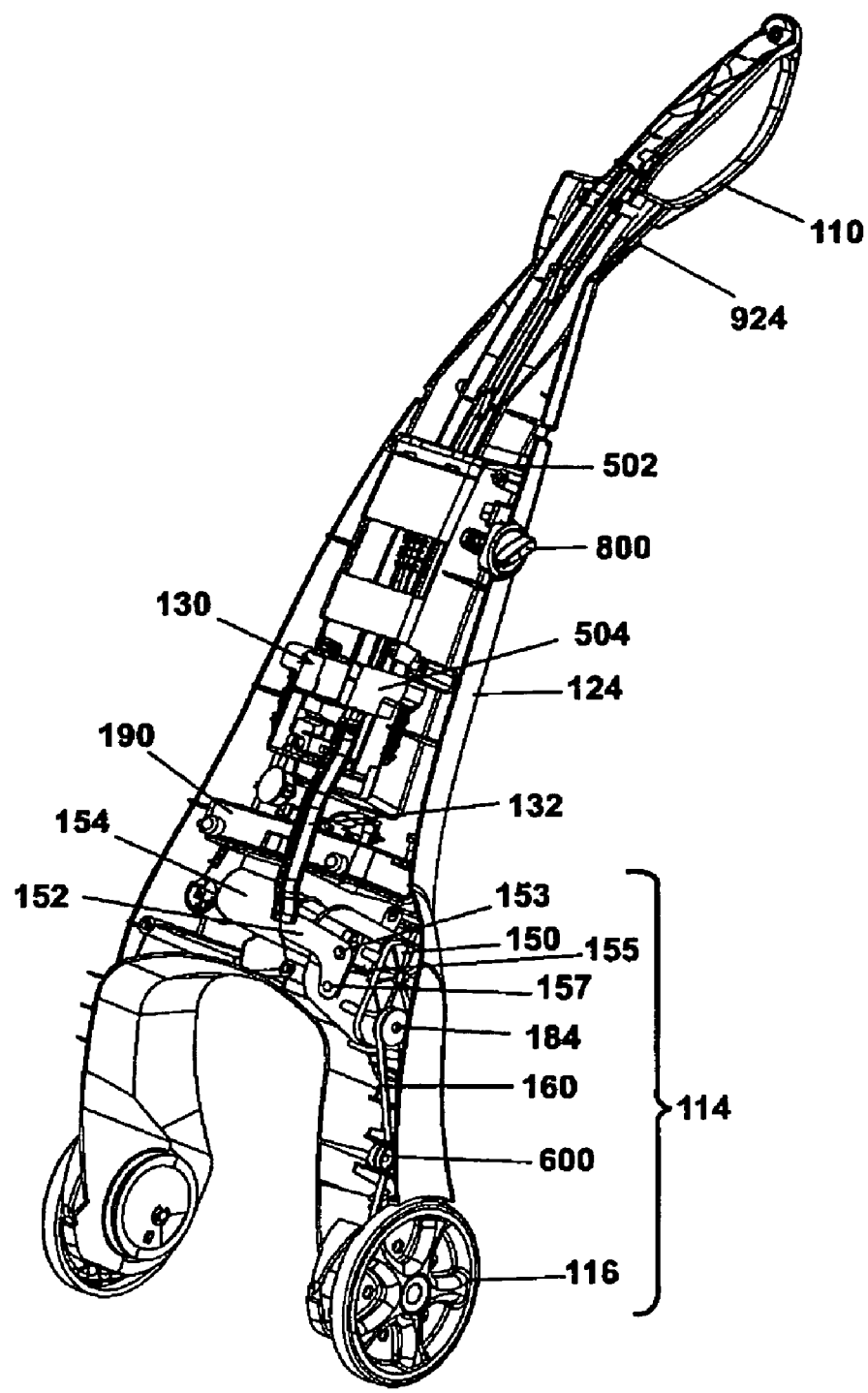
FIG. 3 is a perspective view of the internal components of the upright handle of the extraction cleaner of FIG. 1.
Figure 4:
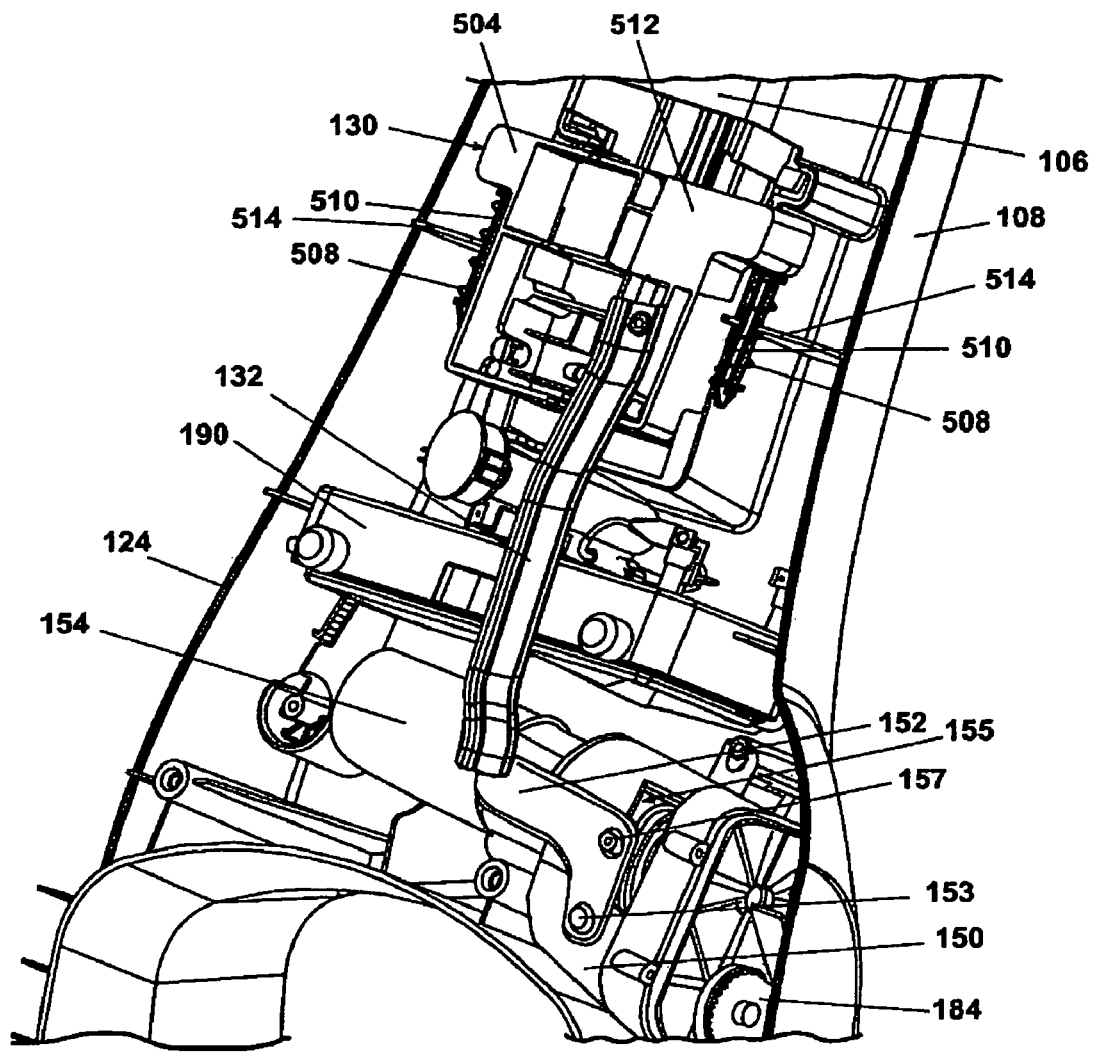
FIG. 4 is an enlarged perspective view of a sliding block and transmission assembly of the extraction cleaner of FIGS. 1–2.
Figure 4A:
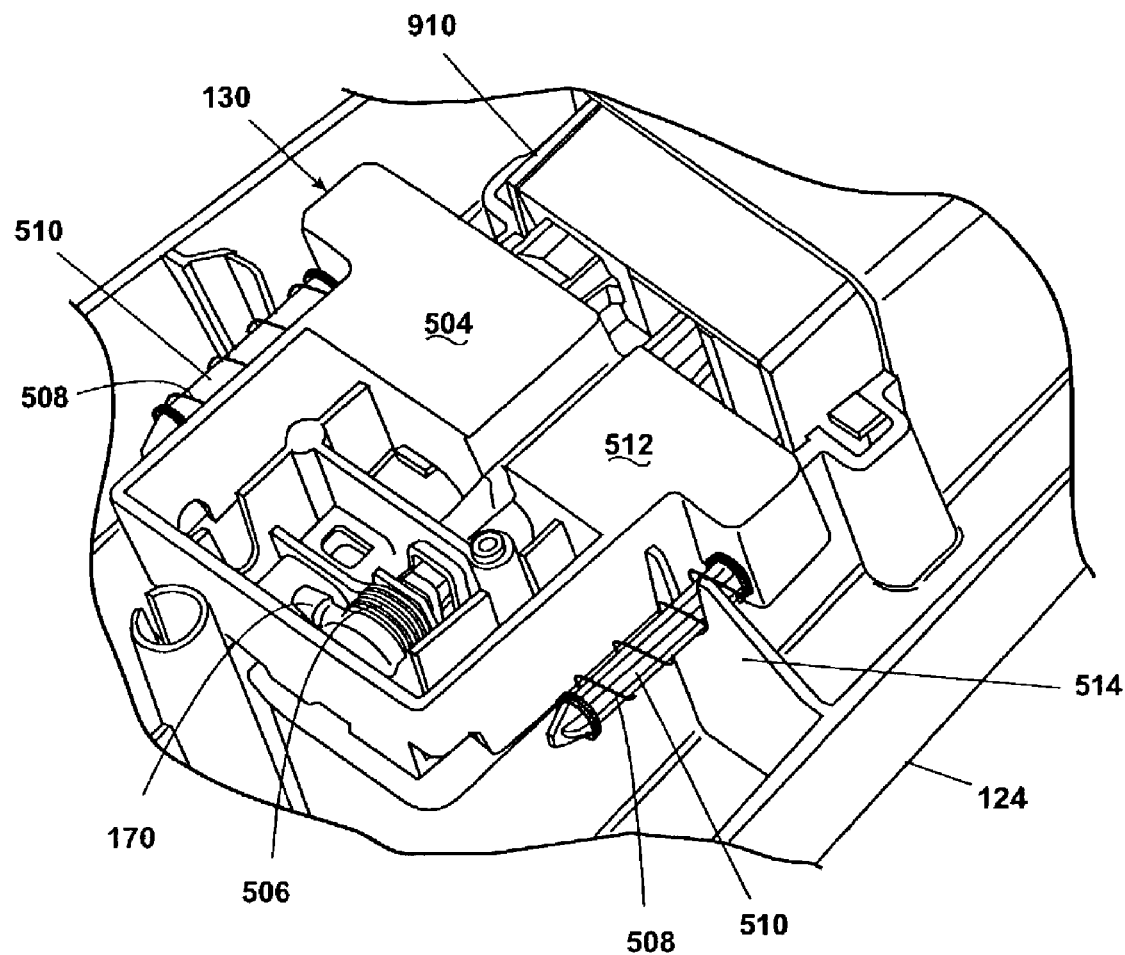
Figure 5:
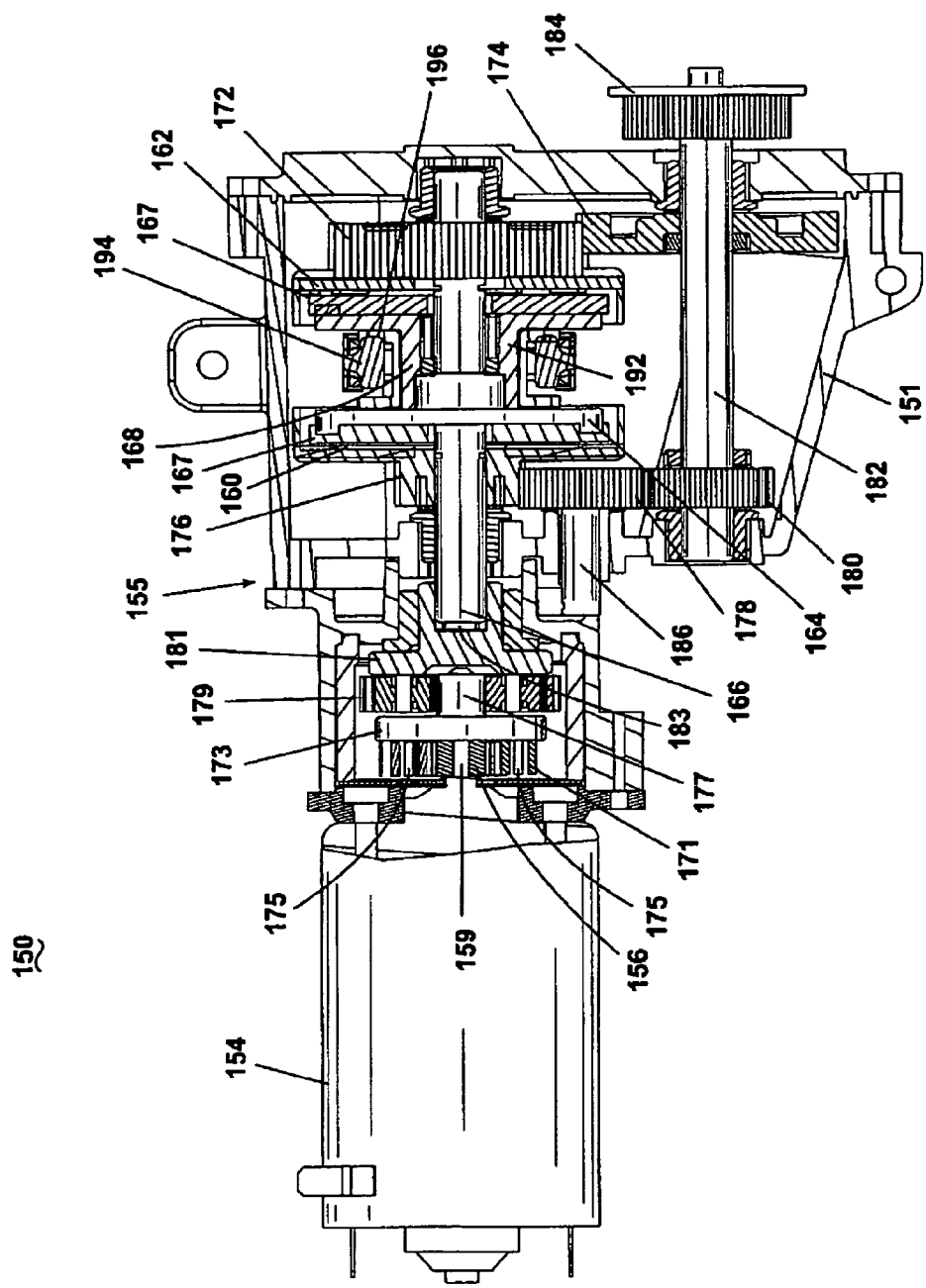
FIG. 5 is a partial cutaway view of a motor/transmission assembly of the extraction cleaner of FIGS. 1–2.
Figure 6:
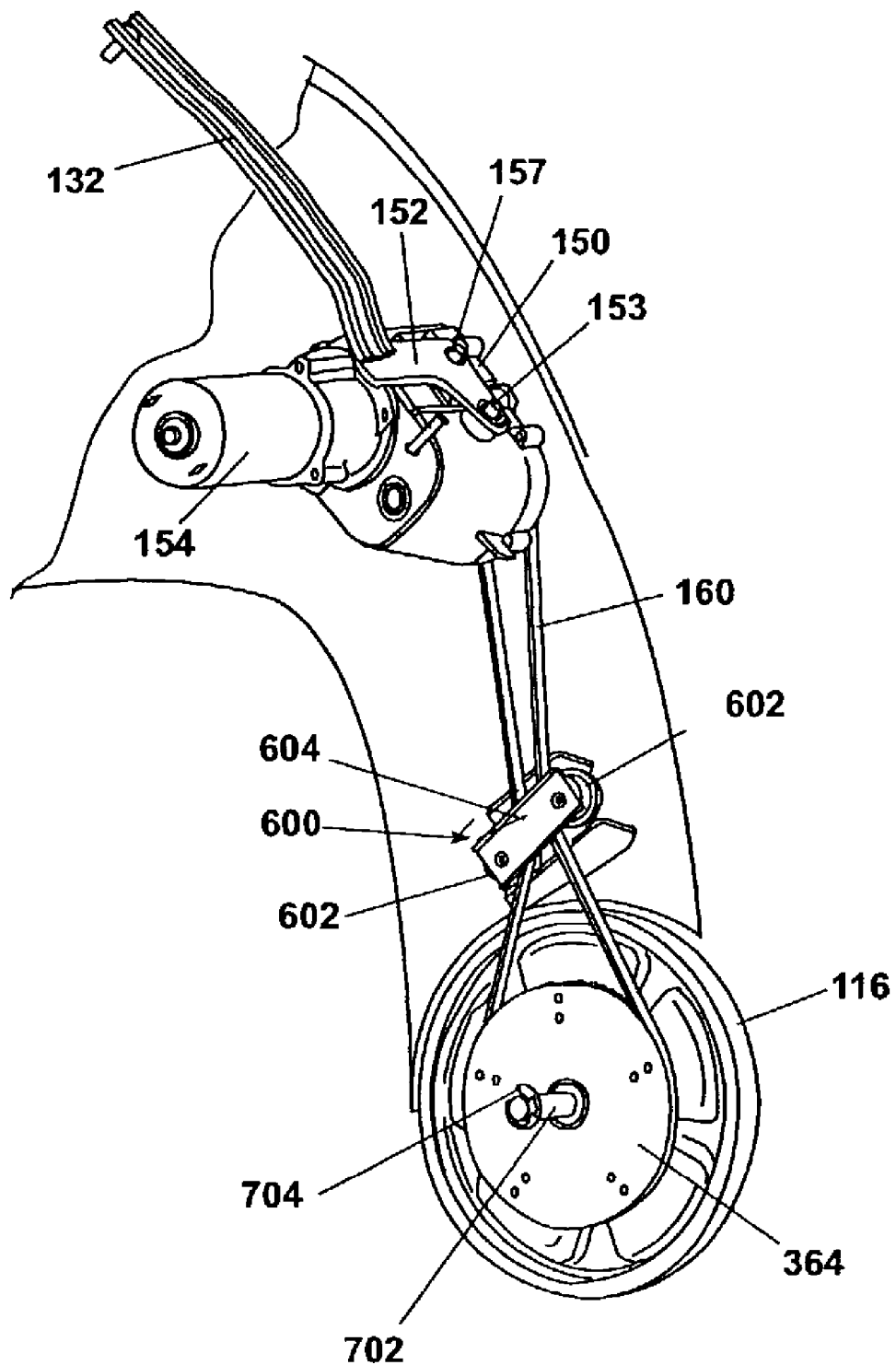
FIG. 6 is a reverse angle perspective view of a drive assembly including a belt tensioner assembly of the extraction cleaner of FIGS. 1–5.
Figure 6A:
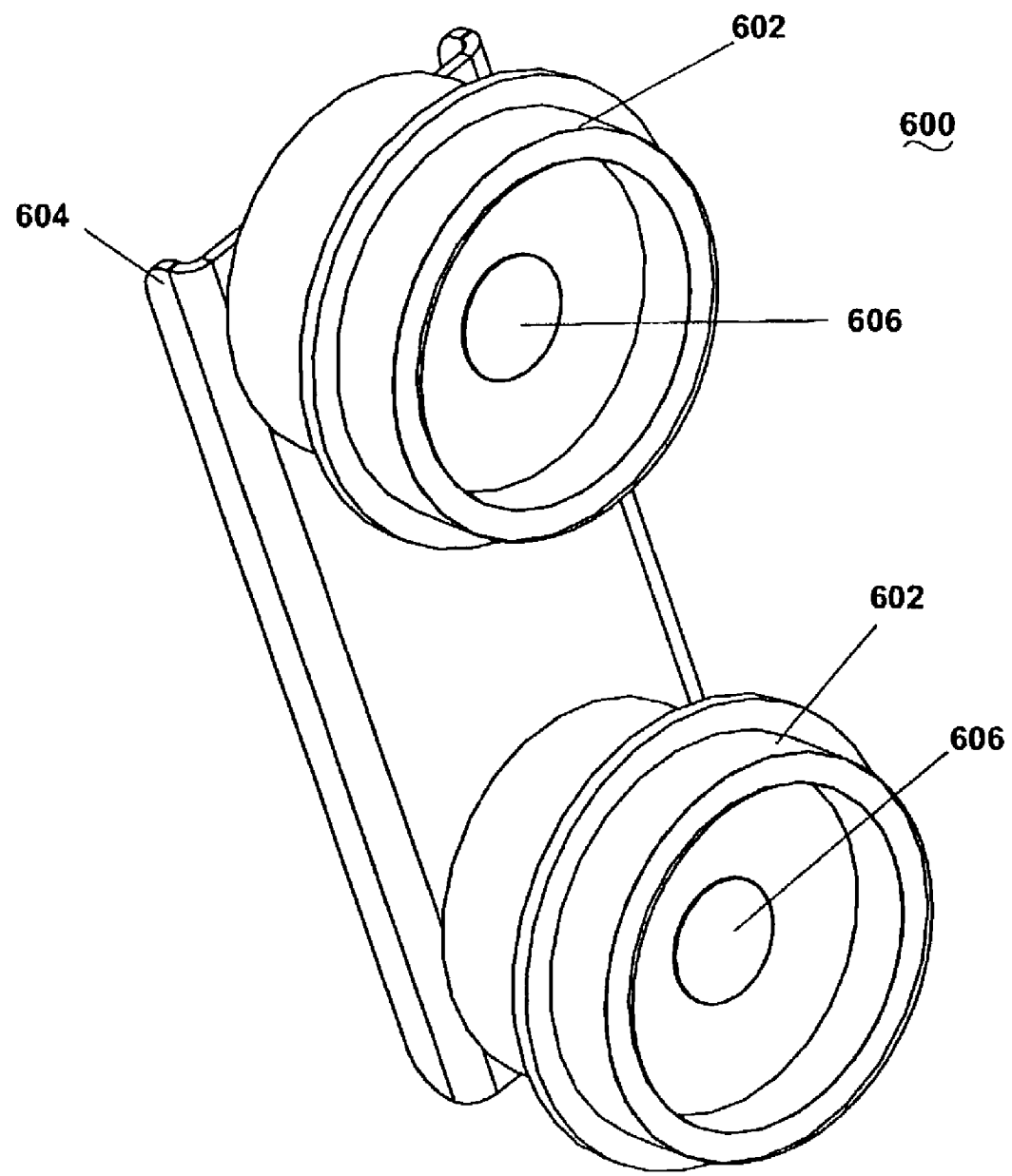
FIG. 6A is an enlarged perspective view of the belt tensioner shown in FIG. 6.
Figure 7:
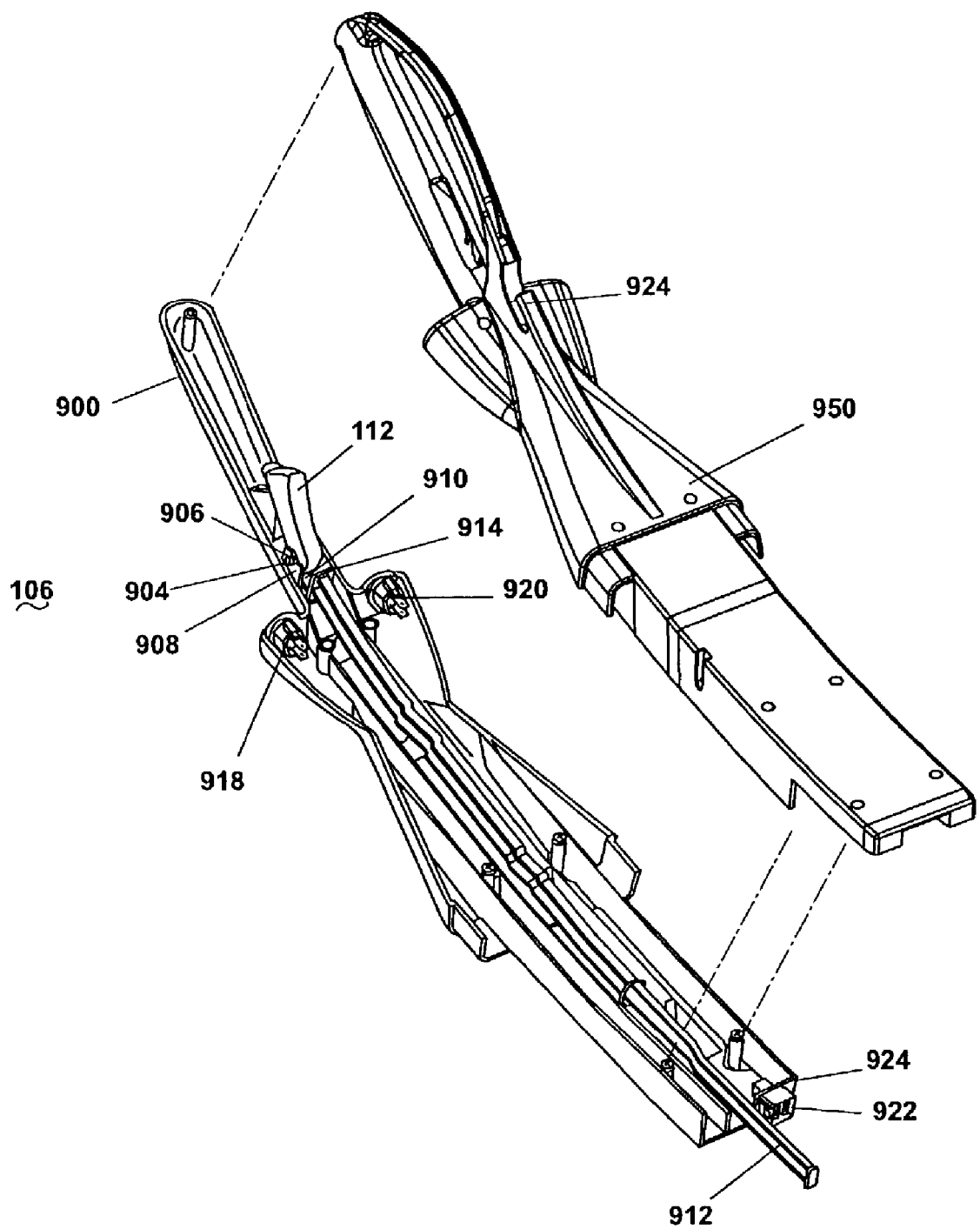
FIG. 7 is an exploded perspective view of an upper portion of an upright handle of the extraction cleaner of FIGS. 1–2.
Figure 7A:
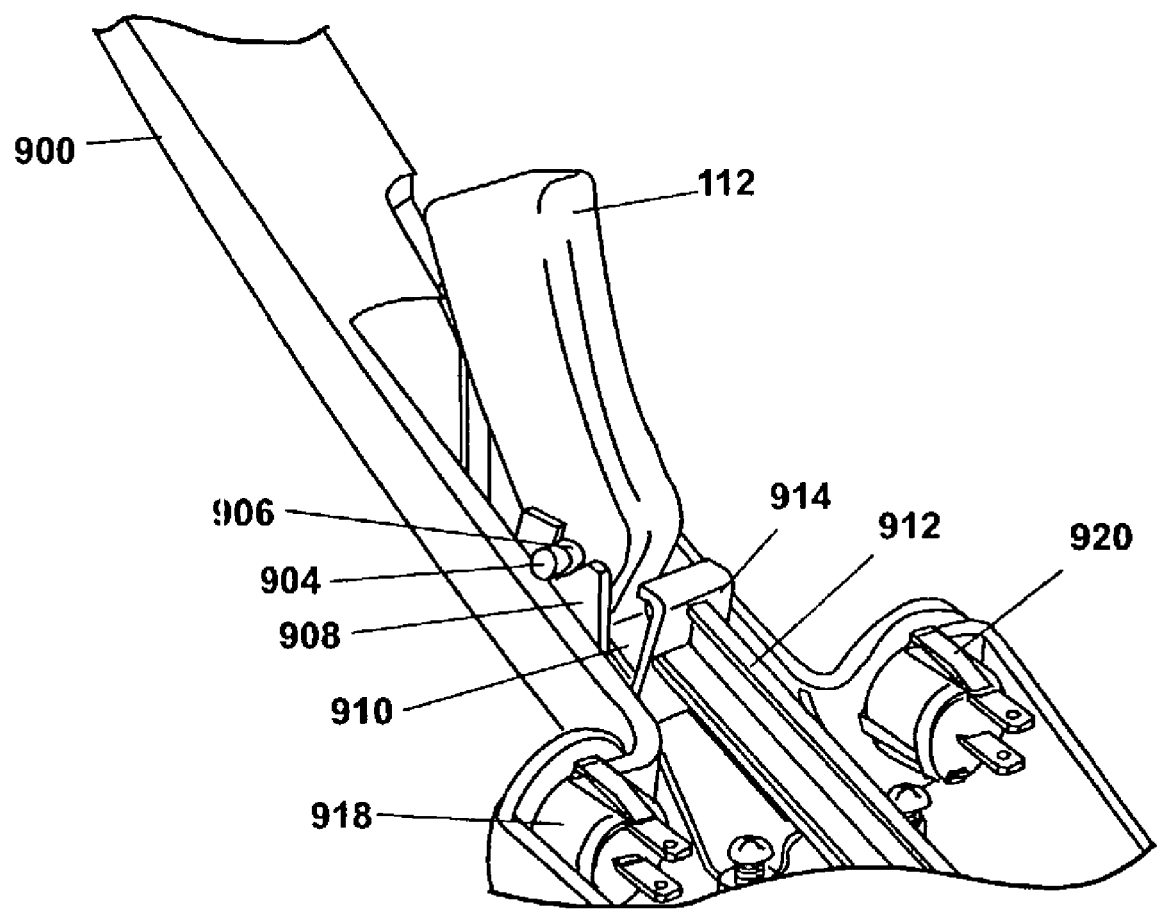

Referring to FIGS. 2–6, a motor/transmission assembly 150 comprising a drive motor 154 and reversible transmission assembly 155 is mounted within lower portion 108 of upright handle 104 and is connected to at least one wheel 116 through a flexible drive belt 160. Referring to FIGS. 3, 6 and 7, a belt tensioner assembly 600, comprising a pair of wheels 602 both rotatably mounted in spaced relationship on a plate 604 by individual axles 606, maintains tension on the drive belt 160. Both runs of the flexible drive belt 160 are positioned between the wheels 602. The wheels 602 are free to rotate about the axles 606. The plate 604 is slidably mounted in a pair of slots or guide walls formed by ribs within the rear shell of the lower handle portion. As the belt is driven in one direction, one side of the belt 160 will be in tension and will tend to stretch taut. This action will slide the plate 604 in the guide walls toward the tensioned belt until the belt is taut. The other side of the belt will be slack but the movement of the plate toward the taut side of the belt will take up the slack in the other side of the belt. As the belt 160 reverses direction, tension is created on one surface of the belt and slack is created on the other. The belt tensioner assembly 600 automatically slides within its support slots to simultaneously reduce the tension on the high tension belt side and pick up the slack on the slack side, resulting in constant belt pressure, thereby improving the reliability of the belt drive by minimizing the occurrence of the belt from dislodging from the power drive assembly. Alternatively, the belt 160 can be positioned outside the wheels 602 to maintain tension on the belt 160.

Figure 6B:
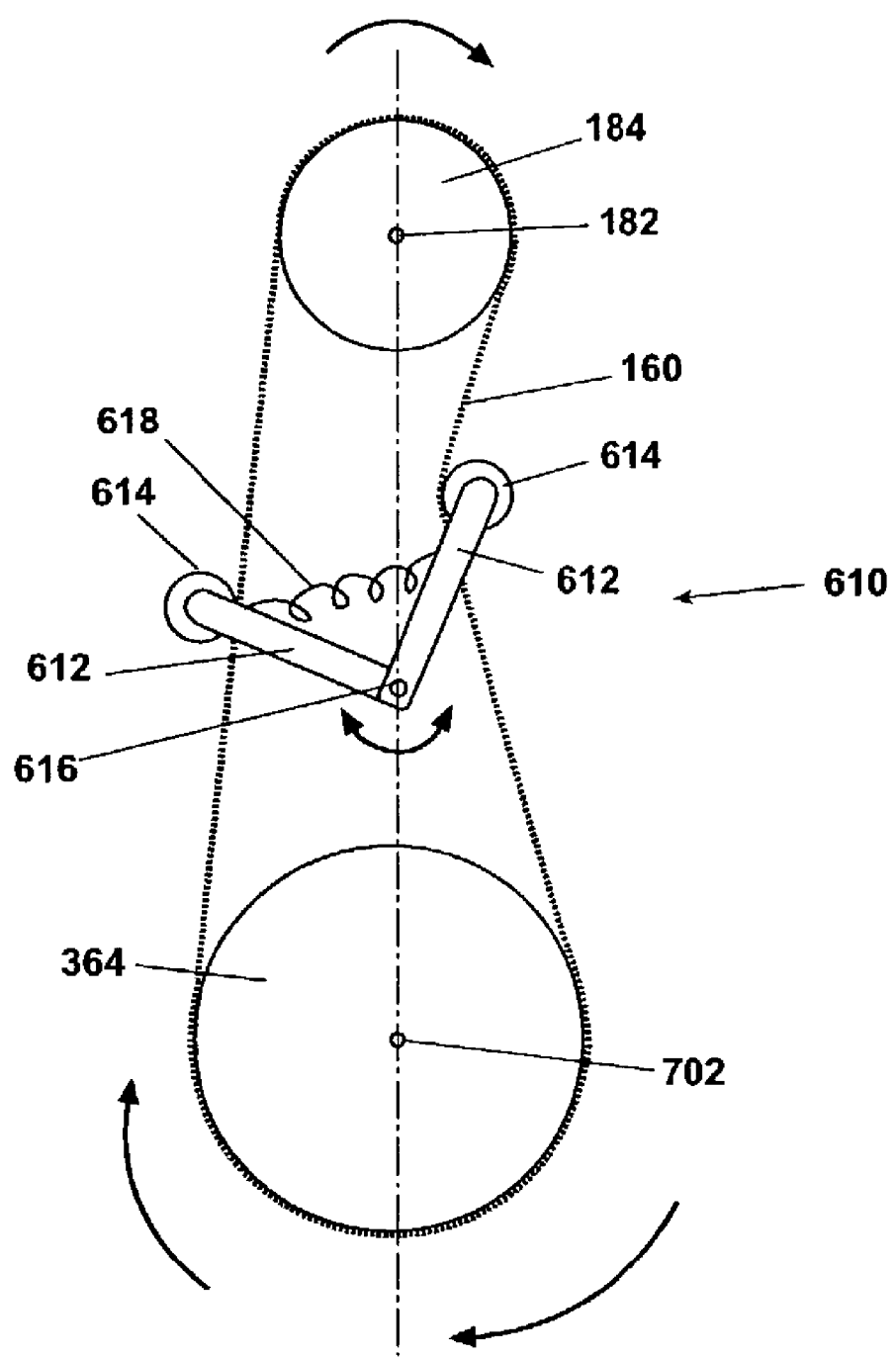
FIG. 6B is a schematic illustration of a power drive assembly according to the invention with an alternative belt tensioning mechanism according to the invention.

In an alternate embodiment shown in FIG. 6B, belt tensioner assembly 610 comprises a pair of support arms 612 that are pivotally mounted to the rear shell 124 through a pivot pin 616 and a tension spring 618 that is stretched between mid portions of the arms 612. Each of the arms 612 rotatably mount a wheel 614 at the free ends thereof. The wheels bear against and roll against the outside of the belt, biased by the compression spring 618 to pull the belt runs toward each other as shown. The arms are arranged generally in a "V" shape as illustrated. The pivot pin 616 is a boss formed in the rear shell 124 of the handle lower portion located on a centerline between the transmission assembly output gear 184 and the wheel sprocket 364. The flexible belt 160 is positioned between the wheels 614 but can alternatively be positioned on the outside of the wheels 614. In the latter case, the spring 618 would be a compression spring. Operation of the belt tensioner assembly 610 is essentially the same as that described for the preferred embodiment 600. When the belt is rotating clockwise as viewed in FIG. 6B in the direction of the arrows, the left side of the belt is taut and the tensioner arms 612 are rotated counterclockwise into the position shown to take up the slack on the other side of the belt. As the belt changes direction, the belt tensioner assembly 610 shifts position clockwise to simultaneously take up slack on the left side and reduce tension on the right side of the belt.

Referring to FIGS 3, 4, and 6, the flexible belt 160 is a timing belt is driven by a belt drive gear 184 and that drives a wheel sprocket 364 on a wheel 116. The wheel sprocket 364 is secured to and rotates with the wheel 116 on axle 702, which is freely rotatable within a bearing in a lower end of the lower handle portion 108. Axial motion of the axle 702 is restricted by a snap ring 704 that fits in a groove on an end of the axle. The motor/transmission assembly 150 is linked to the sliding block assembly 130 by a bar 132, secured at a lower end portion to an end of an actuation lever 152, which is pivotally mounted to the housing of the motor/transmission assembly 150 through pin 153. The lever 152 is attached to a clutch mechanism within the motor/transmission 150 through a clutch pin 157 as will be described in more detail hereinafter. As the sliding block assembly 130 reciprocally moves longitudinally relative to the lower portion 108, the bar 132 moves the end of the actuation lever 152 vertically a corresponding distance, thereby pivoting the lever about pin 153 to move the clutch pin 157 laterally. In so doing, the transmission changes the direction of rotation of belt drive gear 184, depending on the direction of movement of the bar 132.

Referring to FIGS. 4 and 7, the rear shell 124 also houses a block heater 190. The block heater 190 is fluidly connected to a clean solution tank and to a solution dispensing nozzle, both located in the base 102, so that as the fluid from the tank passes through the block heater 190, it is heated for distribution by the dispensing nozzle. A solution valve mechanism 170 is further fluidly connected between the clean solution tank and the solution dispensing nozzle for selectively allowing the passing of fluid from the tank to the nozzle. The solution valve mechanism 170 is operated remotely by depressing trigger assembly 112 while holding handle portion 110, as more fully disclosed in U.S. Pat. No. 6,167,587, which is incorporated herein by reference in its entirety. The connection between the trigger assembly 112 and the solution valve mechanism 170 is simplified by placing the solution valve mechanism 170 in the sliding block assembly 130 within the upper portion 106 so that the relationship between the valve mechanism 170 and the trigger assembly 112 is fixed.

Referring now to FIG. 5, the motor/transmission assembly 150 comprises a drive motor 154 and a transmission assembly 155. In the preferred embodiment, the transmission assembly 155 is reversible. The transmission assembly 155 has a housing 151 that mounts the drive motor through conventional means. The electric motor 154 has an output shaft 159 that mounts a pinion gear 156 that meshes with a set of three first planetary gears 171. Each of the first planetary gears 171 is mounted for rotation on one of three shafts 175 that extend axially from a first gear reduction ring 173. A reduction pinion gear 177 is formed on the center of the first gear reduction ring 173 on a side opposite the shafts 175 and in axial alignment with the motor pinion gear 156. The reduction pinion gear 177 meshes with a set of three second planetary gears 179. The second planetary gears 179 are rotatably mounted on corresponding shafts that extend axially from a first surface of an output ring 181. An output receiver 183 is formed in the center of the output ring 181 on a side opposite the secondary planetary gears 179 in axial alignment with the reduction pinion gear 177 and is journaled in the transmission housing 151. The output receiver 183 comprises a hollow shaft configured with parallel flats formed on opposite sides of the inside diameter of the hollow shaft. A first drive shaft 166 is generally cylindrical in shape with a first end configured with parallel flats formed on opposite sides of the outside diameter. The flats on the outside diameter of the drive shaft 166 correspond with the flats on the inside diameter of the output receiver 183 hollow shaft, thus non-rotatably mounting output ring 181 to the drive shaft 166. The other end of the drive shaft 166 is journaled in the transmission housing 151.

The first drive shaft 166 rotatably mounts a first drive gear 172 and a second drive gear 176 in axial alignment on drive shaft 166. Both drive gears 172, 176 are generally circular and comprise outer circumferential gear teeth. A drive spindle assembly 168 is keyed to the drive shaft 166 between the first drive gear 172 and the second drive gear 176 in axial alignment therewith. First drive gear 172 has a first clutch plate 162 mounted on a face adjacent to the drive spindle 168. Second drive gear 176 has a second clutch plate 164 on a face adjacent to the drive spindle 168. Drive spindle assembly 168 includes a clutch block 192, a yoke 194 and friction clutch material 167. The clutch block 192 is keyed to and rotates with the drive shaft 166, but can slide laterally a predetermined distance along the drive shaft 166 between the clutch plates 162 and 164. The yoke 194 is U-shaped and the legs thereof span the outside diameter of the clutch block 192. The legs of the yoke incorporate guides 196 that are received in an annular groove in the clutch block 192. The bite portion of the yoke 194 is pinned to the actuator lever 152 through pin 157 (FIG. 4) and is pinned to the transmission housing 151 at an end portion of the legs. The midportion of the legs are laterally movable with respect to the transmission housing a relatively short distance. Lateral movement of the bite portion of the yoke 194 relative to the drive shaft 166 results in a corresponding movement of the clutch block 192 through the guides 196. The friction clutch material 167 is mounted on the surfaces of the clutch block 192 facing the secondary drive gears 172, 176.

Thus, pivotal movement of the actuation lever 152 about pin 153 will displace the spindle 168 axially on drive shaft 166. As drive spindle 168 is axially displaced on drive shaft 166 toward one of the drive gears 172, 176, that drive gear is driven by the first drive shaft 166 through a corresponding clutch plate 162, 164 due to the friction generated by the friction clutch material 167 against the corresponding clutch plate.

Drive gear 172 meshes with a third drive gear 174, which is fixedly mounted on a second drive shaft 182. The second drive shaft 182 is journaled in the transmission housing 151. When drive spindle 168 frictionally grips the first clutch plate 162, the first clutch plate 162 and second drive gear 172 rotate and in turn rotates the third drive gear 174 and the second drive shaft 182 in a first direction. The second drive shaft 182 further non-rotatably mounts a belt drive gear 184 on one end thereof. A drive belt 160 is mounted on the belt drive gear 184 and on drive wheel sprocket 364 for transferring the drive force to at least one wheel 116 of the extraction cleaner 100.

The second drive gear 176 is intermeshed with an idler gear 178 that is mounted for rotation on an idler shaft 186. Idler shaft 186 is mounted on the transmission housing 151. Idler gear 178 is intermeshed with a third drive gear 180 fixedly mounted on the second drive shaft 182. When drive spindle 168 presses the clutch block 192 against the second clutch plate 164, second drive gear 176 drives idler gear 178 which 178 that in turn drives the third gear 180 and the second drive shaft 182 in a second direction. The drive force transferred to the at least one wheel of the extraction cleaner is in a direction opposite to the direction resulting from forcing the clutch block 192 against the second clutch plate 164. The drive wheel is thus selectively propelled in one of two directions, dependent upon the direction of the force applied on actuation bar 152 and the direction of movement of the drive spindle 168 toward first clutch plate 162 or second clutch plate 164.

Referring to FIG. 7, the upper portion 106 of the upright handle 104 comprises a front shell 900 and a rear shell 950. The front shell 900 further comprises a solution trigger 112 that rotates about an integral pin 904. The pin rests in a slot 906 that is integrally formed in a rib 908 located on an interior surface of the front shell 900. A lower end 910 travels in a downward motion when the trigger 112 is depressed. A control rod 912 with a first end 914 and a second end 916 interfaces with the trigger lower end 910 via the first end 914.

A vacuum switch 918 is located on a side of the front shell 900 and is electrically connected to a connector 922 located at lower end 924 of the front shell 900. A heater switch 920 is located on a side opposite the vacuum switch and is likewise electrically connected to the connector 922.

The rear shell comprises a handle portion 110 and a cord clip 924 integrally molded on a rearward surface. The cord clip 924 allows the user to route the power cord through the clip providing easy management of the power cord during use. The rear shell 950 serves to enclose the aforementioned components and enhance the aesthetics.

Referring now to FIGS. 2, 3, and 4, a drive actuator 136 comprises the sliding connection between the upper portion 106 and the lower portion 108 of the upright handle 104. The upper portion 106 slides into an opening at a first end 500 of the lower portion 108 to form the upright handle 104. A bearing sleeve 502 is located at a receiving end of the lower portion 108 rear shell 124 and functions to reduce friction and wear created as the upper portion 106 slides relative to the lower portion 108. A sliding block assembly 130 is located within positioning ribs formed in the rear shell 124 of the lower portion 108. The rear shell 950 of the upper portion 106 extends a sufficient distance to overlap a rearward surface of the block assembly 130. The block assembly 130 is fixedly attached to the upper portion 106 by screws or other suitable fasteners. The block assembly 130 further comprises a block 504 that houses the solution valve 170 and the solution valve spring 506. A pair of spring posts 510 is integrally formed with the block 504 on opposite sides thereof and each post 510 is slidably mounted on a rib 514 of the rear shell 124. A coil spring 508 is mounted on each of the spring posts 510. Central portions of the coil springs 508 are retained by the ribs 514 to return block 504 to a neutral position in the absence of an external force by the user between the upper and lower portions 106, 108 of the handle assembly 104. A top surface 512 of the block 504 registers with the lower end 910 of the upper portion 106.

Figure 8:
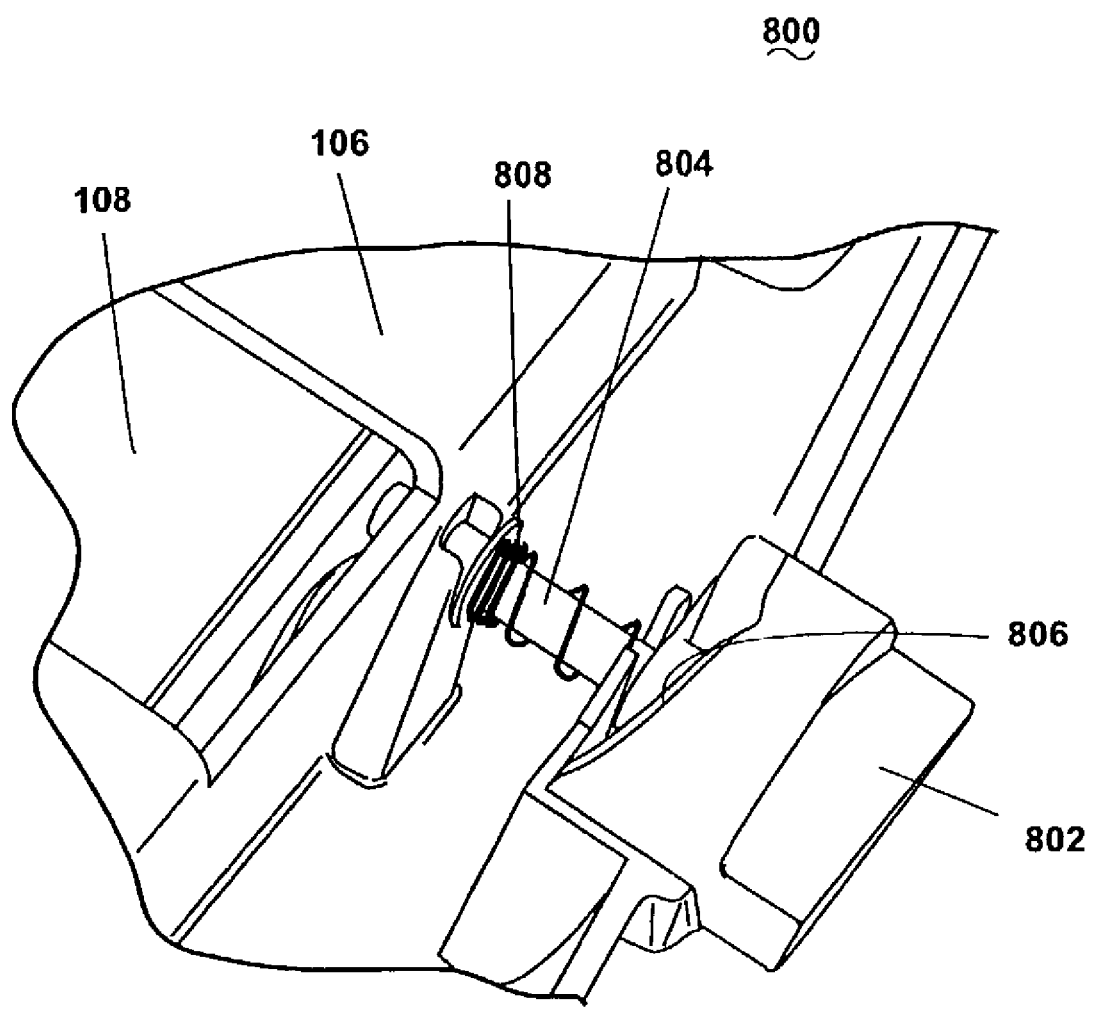
FIG. 8 is an enlarged perspective view of a neutral transmission lock of the extraction cleaner of FIGS. 1–2.

Referring now to FIG. 2 and 8, a neutral lock assembly 800 is located on an upper portion of the lower portion 108 of the upright handle 104. The neutral lock assembly comprises a knob 802 that is fixed to a shaft 804. A cam ramp 806 is formed on a bottom surface of the knob 802 perpendicular to the shaft 804. Apertures in both the upper portion 106 and lower portion 108 correspond axially with the shaft 804. A spring 808 is positioned over the shaft 804 and between two locating ribs integrally formed on an interior surface of the rear shell 124. Rotation of the knob 802 moves the shaft 804 in or out, depending upon the position of the ramp 806 and positions the shaft 804 in register with the corresponding apertures in the upper portion 106 and lower portion 108 when the upper portion 106 and lower portion 108 are in a neutral position. When the shaft 804 is in register with the apertures in the upper portion 106 and lower portion 108, the upper portion 106 is locked into the neutral position in that the lower portion 108 and the transmission assembly 155 is fixed in the neutral position with respect to the upper portion 106. When the shaft 804 is disengaged from the apertures, the handle portions 106, 108 and slide with respect to each other for selective engagement of the transmission assembly 155 as previously described. The neutral lock assembly 800, therefore, provides a mechanism for selectively locking the cleaner drive in a neutral position so that the user can move the cleaner from one location to another without engaging the transmission assembly 155 while the wheels 116 freely rotate with minimal friction.

In operation, the user pushes or pulls the actuation device defined by the upper portion 106 of the upright handle 104. The upper portion 106 slides within the lower portion 108 over a specified range of travel. The upper portion 106 registers with the sliding block assembly 130 which registers with the transmission assembly 155 actuation lever 152 through the bar 132. Therefore, motion of the upper portion 106 is directly translated to motion of the actuation lever 152 causing the drive spindle 168 to move laterally in a direction dependent upon the direction in which the upper portion is moved. Clutch plates 164 are selectively engaged within the transmission assembly 155 which impart motion through the previously described gear train to the belt drive gear 184. A drive mechanism comprising the drive belt 160 translates motion to the traction driver 134 comprising the wheel sprocket 364 via the drive belt 160 that results in selective rotation of the wheel 116. Friction between the wheel 116 and the surface to be cleaned results in selective movement of the cleaner across the surface.

With respect to solution delivery to the surface to be cleaned, the solution valve 170 is fixed to the block assembly 130 that in turn is fixed to the upper portion 106 of the upright handle. When the trigger 112 is engaged, the control rod 912 is forced down which, in turn, forces the solution valve 170 open and allows cleaning fluid to flow to the surface to be cleaned. When the trigger 112 is released, the solution valve spring 506 returns the solution valve 170 to the closed position thus shutting off the flow of solution. The solution valve spring 506 correspondingly returns the control rod 912 and trigger 112 to their original positions.

Figure 9:
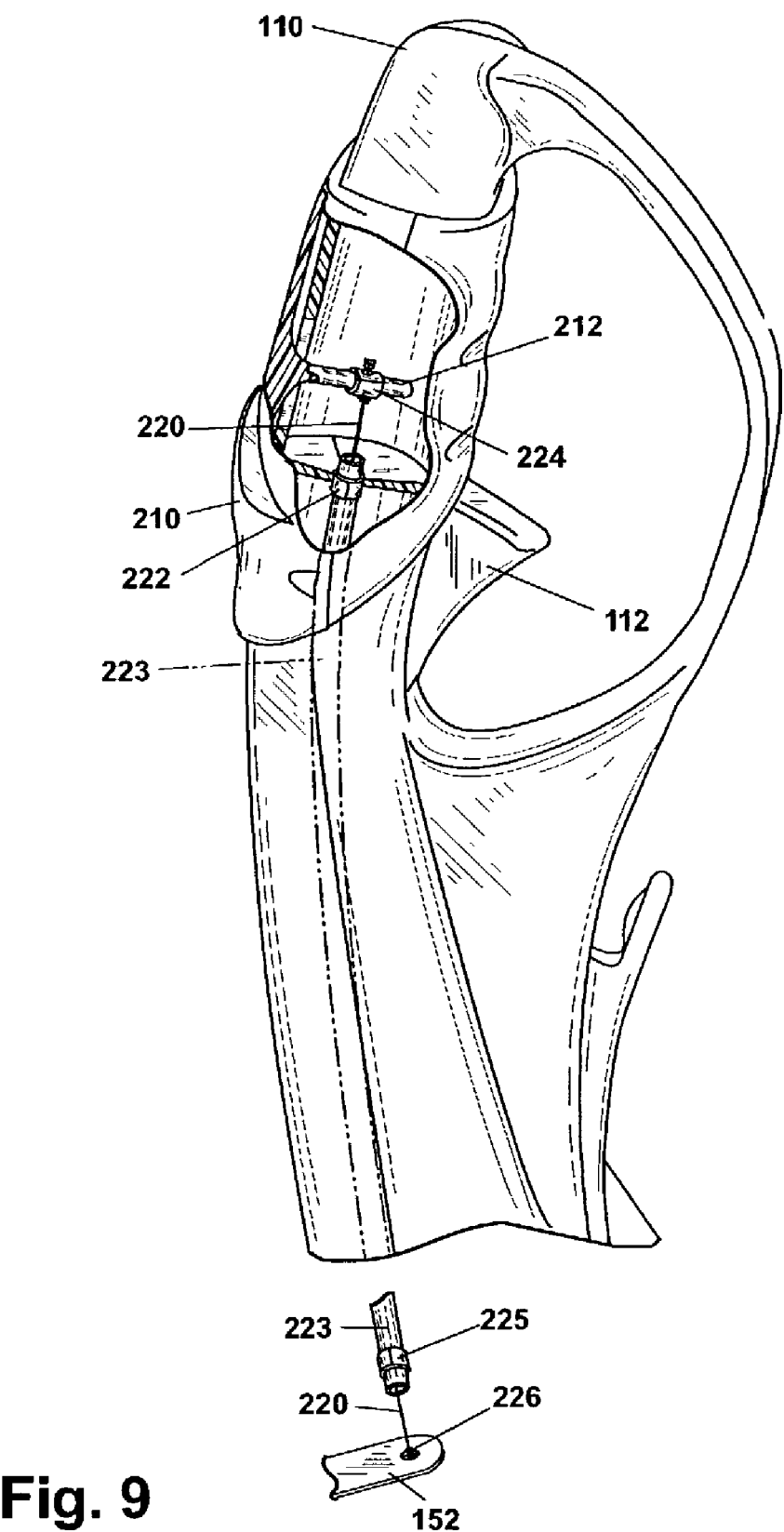
FIG. 9 is a cutaway perspective view of a handle sleeve actuator according to a second embodiment of the extraction cleaner according to the invention.

Referring now to FIG. 9, a second embodiment of a drive actuator 136 comprises a handle actuator sleeve 210 slidably mounted on the handle grip 110 of the upright handle 104 of the extraction cleaner 100. The handle actuator sleeve 210 includes an internally projecting cable bracket 212 that passes through a slot in the handle portion 110 and retains a first end 224 of a sleeved actuation cable 220. The sleeve of the actuation cable 220 is retained in the handle portion 110 by a first cable clip 222, so that as sleeve 210 moves on handle portion 110, cable 220 slides within sleeve 223. A second end of sleeve 223 is held by a second cable clip 225 adjacent the transmission assembly 155 so that a second end 226 of cable 220 attached to actuation lever 152 imparts a motive force on lever 152 to actuate transmission assembly 155 as in the first embodiment.

Figure 10:
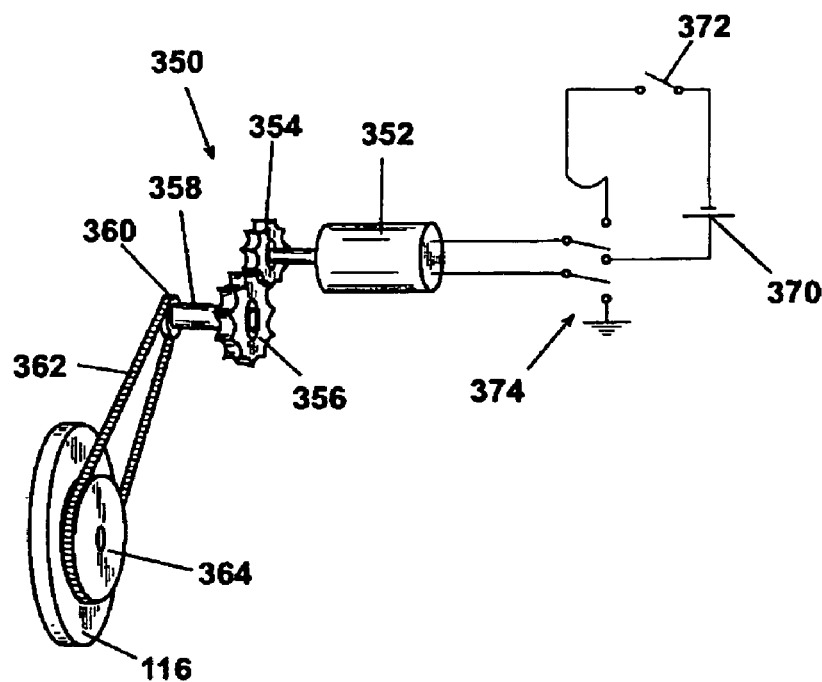
FIG. 10 is a schematic representation of an extraction cleaner with power drive according to a third embodiment of the invention.

A third embodiment of a power drive assembly 350 for an extraction cleaner is shown in FIG. 10. In this embodiment, the drive motor 154 comprises a reversible DC motor 352 driving a transmission assembly 155 comprising a pinion gear 354 that is intermeshed with a secondary gear 356. The secondary gear 356 is fixedly attached to a drive shaft 358 for transferring rotational motion to a traction driver comprising a belt drive sprocket 360 and wheel 116. A transmission assembly 155 comprising a drive belt 362 then transfers rotational motion to a wheel sprocket 364 for rotating a drive wheel 368 of the extraction cleaner. The reversible DC motor 352 is electrically connected to a DC power source 370 by a power switch 372 and a double pole double throw switch 374. The double pole double throw switch 374 can take the form of a standard form three-position toggle on the handle portion 110 for thumb actuation by a user, or can be internally mounted in the handle portion 110 and arranged to be controlled by an activation device such as the handle actuator sleeve 210.

Figure 11:
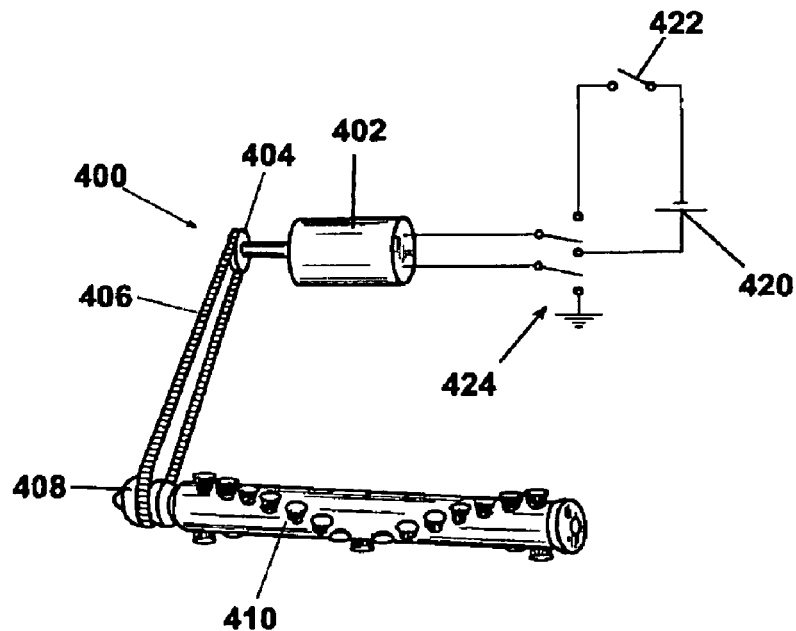
FIG. 11 is a schematic representation of an extraction cleaner with power drive according to a fourth embodiment of the invention.

Referring now to FIG. 11, a fourth embodiment of a power drive assembly 400 for an extraction cleaner comprises a drive motor 154 comprising a reversible DC motor 402 operably connected to a traction driver 134 comprising an agitation/drive brush 410. The motor 402 drives transmission assembly 155 comprising a belt drive sprocket 404. A drive mechanism comprising a drive belt 406 mounted on the belt drive sprocket 404 then transfers the force to a brush sprocket 408 for rotating the traction driver 134 comprising an agitation/drive brush 410. The agitation/drive brush 410 is in contact with the surface being cleaned. As it rotates in one of two directions, the agitation/drive brush 410 imparts a degree of motive force against the surface to drive the extraction cleaner. The reversible DC motor 402 is connected to a DC power source 420 by a power switch 422 and a double pole double throw switch 424 as disclosed in the previous embodiment.

Figure 12:
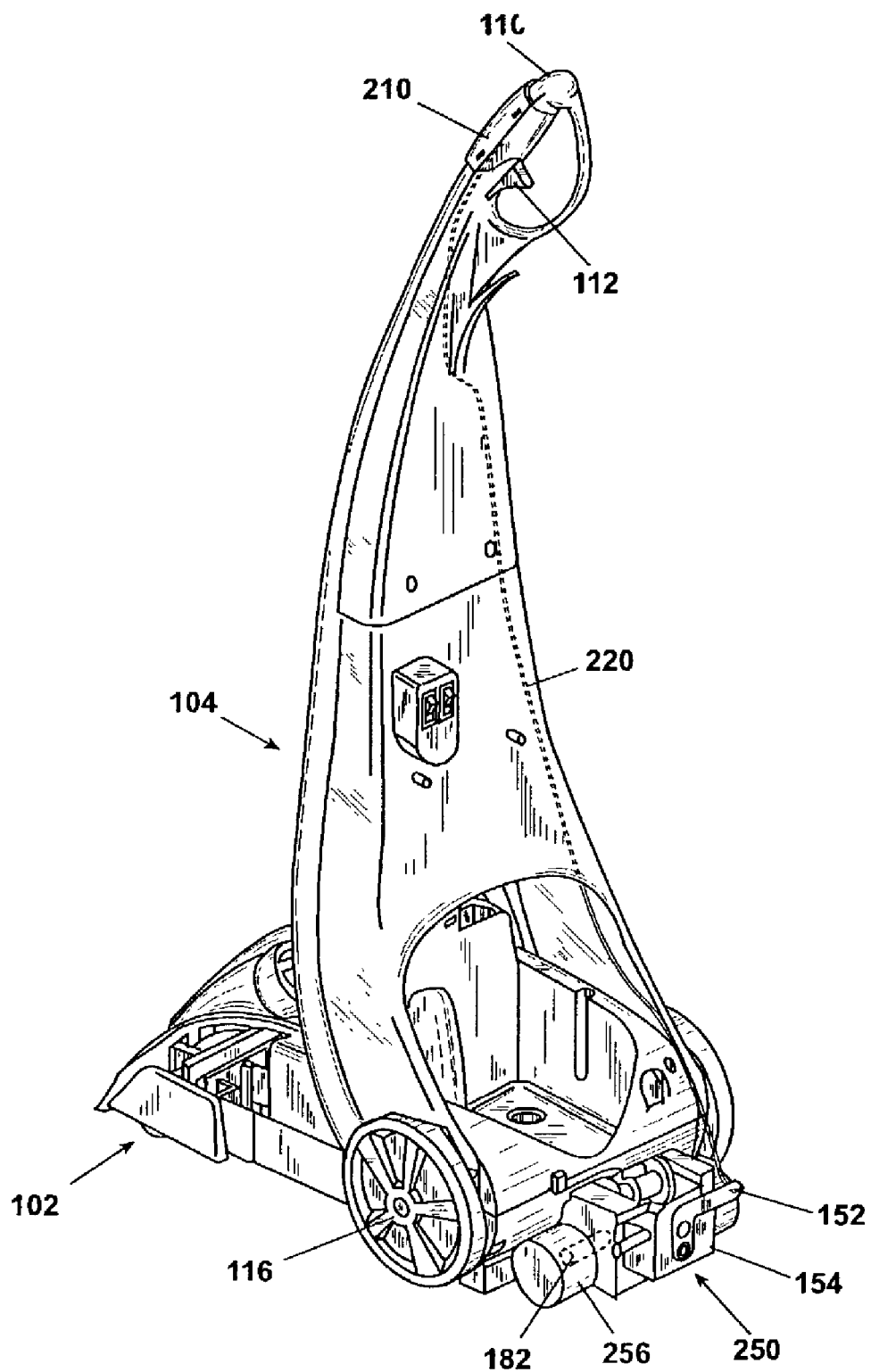
FIG. 12 is a rear perspective view of an extraction cleaner with power drive according to a fifth embodiment of the invention.

Referring to FIG. 12, a fifth embodiment of a power drive assembly 250 is mounted to a rear portion of base housing 102. The power drive assembly 250 comprises a drive motor 154 and transmission assembly 155 according to FIGS. 2 through 6, except that tertiary drive shaft 182 bears a drive wheel 256 for applying a driving force to a floor surface for propelling the extraction cleaner. The tertiary drive shaft 182 of the FIG. 5 embodiment can be further modified so that it extends from both sides of the assembly 250 to carry a pair of drive wheels 256. The preferred actuation device for this embodiment is the handle actuator sleeve 210 (see FIG. 9) linked by cable 220 to control the transmission device of the power drive assembly 250.

Figure 13:
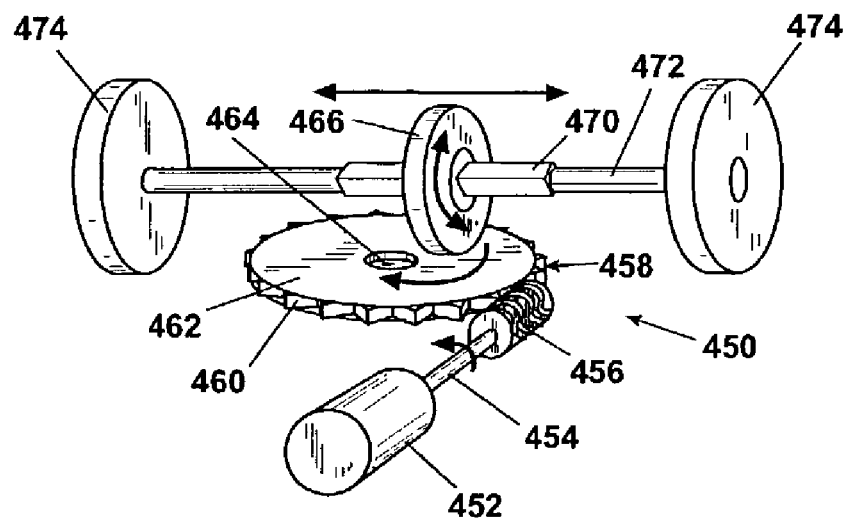
FIG. 13 is a schematic representation of a power drive for extraction cleaner according to a sixth embodiment of the invention.

Referring to FIG. 13, a sixth embodiment of a power drive assembly 450 for an extraction cleaner is disclosed. The power drive 450 comprises drive motor 154 comprising a motor 452 having a drive shaft 454 mounting to a transmission assembly 155 comprising a worm gear 456. The worm gear 456 is arranged to engage a geared lower surface 460 of a flywheel 458. The flywheel 458 includes a smooth upper surface 462 including a depression 464 centrally located on the axis of rotation of the flywheel 458. A drive wheel 466 is slidably keyed on a drive shaft 472 that is perpendicular to the rotational axis of the flywheel 458 and spaced from the smooth upper surface 462 so that a gripping outer surface of drive wheel 466 can operably engage smooth upper surface 462. The drive wheel 466 is keyed to drive shaft 472 by a keyed sleeve 470 so that drive wheel 466 is rotationally fixed but axially slidable on drive shaft 472. A mechanism similar to that utilized to shift the drive spindle of the first embodiment is anticipated for shifting the drive wheel 466 to one side or the other of the central depression 464. When the drive wheel 466 is centered over the depression 464, no driving force is transferred from the flywheel 458 to the drive wheel 466. When the drive wheel 466 is shifted to one side of the depression 464, rotation is imparted in the drive shaft 472 in a first direction. When the drive wheel 466 is shifted to the other side of the depression 464, rotation is imparted in the drive shaft 472 in a second direction, thus making the drive mechanism reversible. At least one wheel drive gear 474 is mounted to the drive shaft 472 for transferring rotational motion to at least one of the drive wheels of the extraction cleaner.

Figure 14:
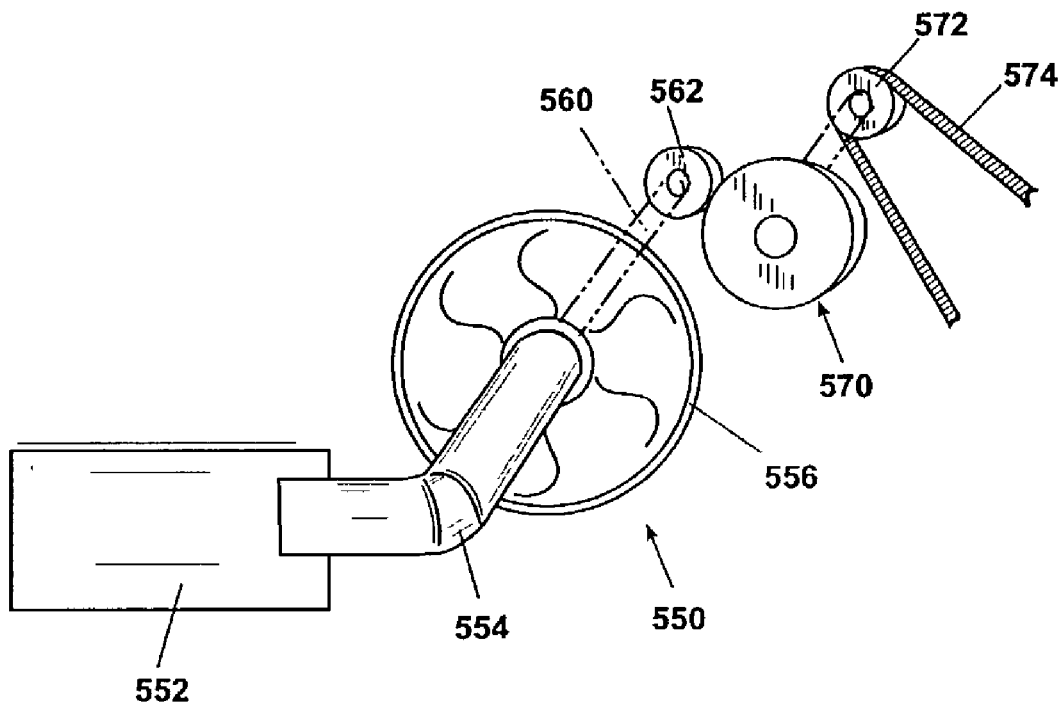
FIG. 14 is a schematic representation of an extraction cleaner with power drive according to a seventh embodiment of the invention.

Referring now to FIG. 14, a seventh embodiment of a power drive assembly 550 for an extraction cleaner comprises a suction source 552 of the extraction cleaner 100 fluidly connected to a drive motor 154 comprising a turbine motor 556 via a fluid conduit 554, as disclosed in commonly owned U.S. patent application Ser. No. 60/312,122 filed Aug. 14, 2001. The turbine motor 556 rotates a turbine chive shaft 560 on which is mounted a pinion gear 562. The pinion gear 562 is intenneshed with a secondary gear or transmission 570 that drives a belt drive sprocket 572. The belt drive sprocket 572 is engaged by a drive belt 574 for transferring rotational motion to a drive wheel of the extraction cleaner.

Figure 15:
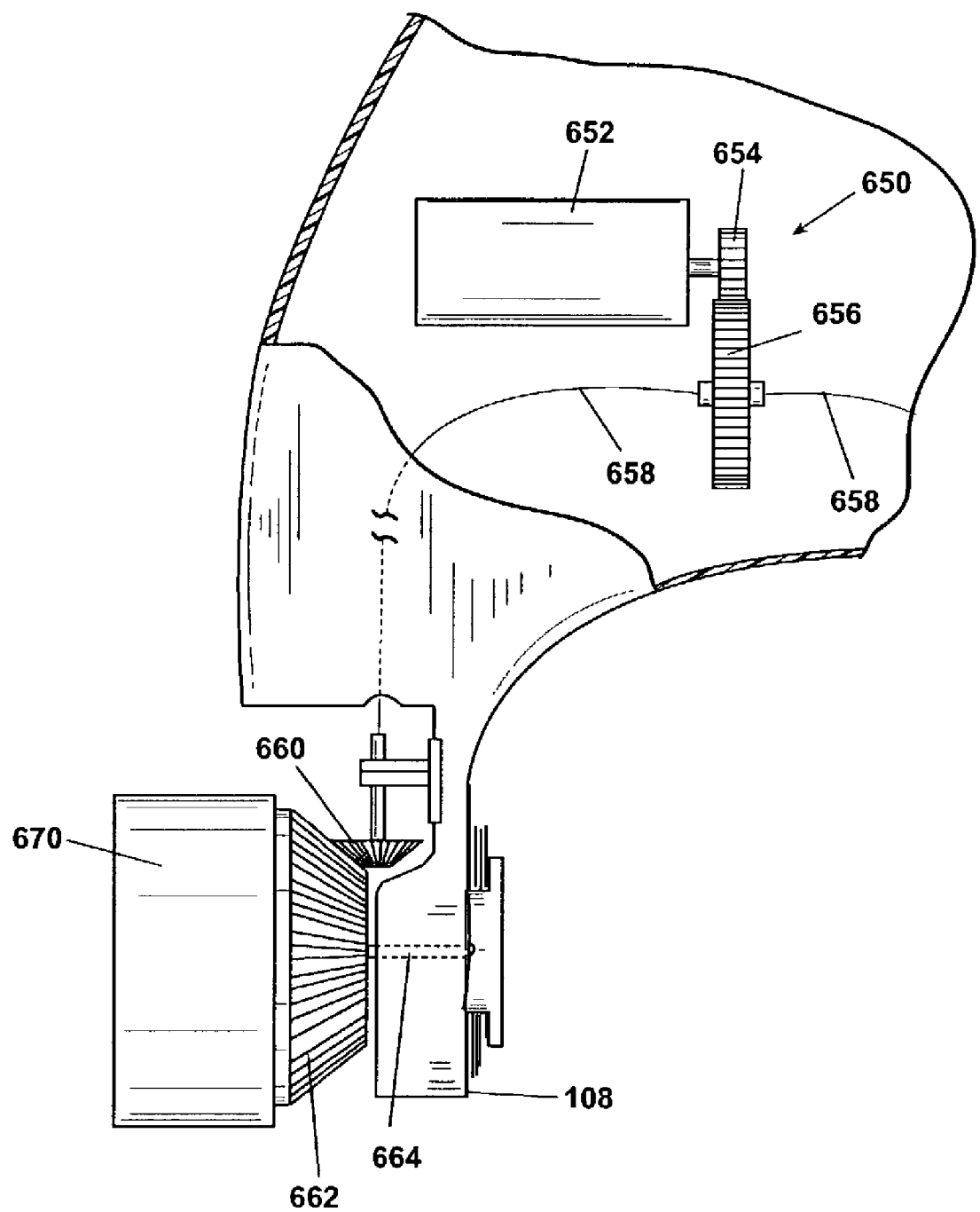
FIG. 15 is a schematic representation of a power drive for extraction cleaner according to an eighth embodiment of the invention.

Referring to FIG. 15, a cable power drive assembly 650 for extraction cleaner 100 is disclosed. The cable power drive assembly 650 comprises a drive motor 154 comprising a motor 652 having a pinion gear 654 intermeshed with a transmission assembly 155 comprising a secondary gear/transmission 656. Secondary gear/transmission 656 is operably connected to a drive mechanism comprising a flexible cable/rod 658 routed through the lower portion 108 of the upright handle 104 to terminate at a bevel gear 660 positioned adjacent a wheel 670 of the upright extraction cleaner. A traction driver 134 comprising the wheel 670 is formed with a second bevel gear 662 on an inner face thereof for engaging the bevel gear 660. The wheel 670 is rotationally mounted to the lower portion 108 of the upright handle 104 by wheel axle 664. As motor 652 rotates pinion 654 and secondary gear/transmission 656, the rotational force is transmitted through the flexible cable 658 to bevel gear 660 and drive wheel 670 rotates about wheel axle 664. To provide a reversible drive mechanism, motor 652 can be reversible or secondary gear/transmission 656 can comprise a reversible transmission assembly according to the first embodiment. In a further embodiment, a second flexible cable 658 with bevel gear 660 can be routed to another wheel 670 of the upright extraction cleaner 100.

Figure 16:
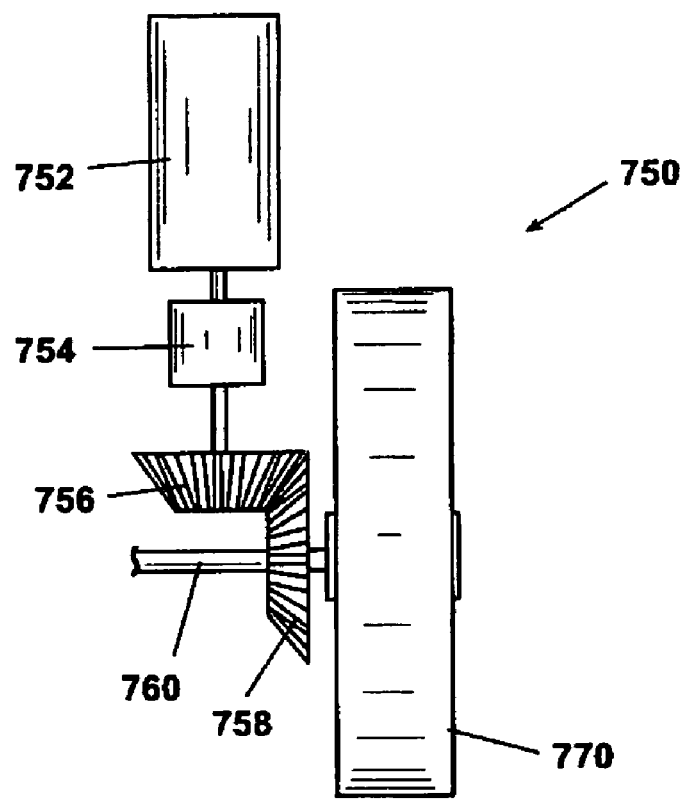
FIG. 16 is a schematic representation of a power drive for extraction cleaner according to a ninth embodiment of the invention.

Referring to FIG. 16, a ninth embodiment of a power drive assembly 750 comprises a drive motor 154 comprising a direct drive motor 752 positioned proximate each powered wheel 770. Power is selectively transferred from the motor 752 by a transmission device comprising a clutch/transmission assembly 754 to a drive mechanism comprising a first bevel gear 756, which is intermeshed with a second bevel gear 758. Second bevel gear 758 is affixed to traction driver 134 comprising a wheel 770, which rotates about wheel axle 760. In a preferred embodiment, motor 752 is a reversible motor for driving wheel 770 in a forward or rearward direction. In the alternative, clutch/transmission assembly 754 is a reversible transmission assembly according to FIGS. 2–6.

Figure 17:
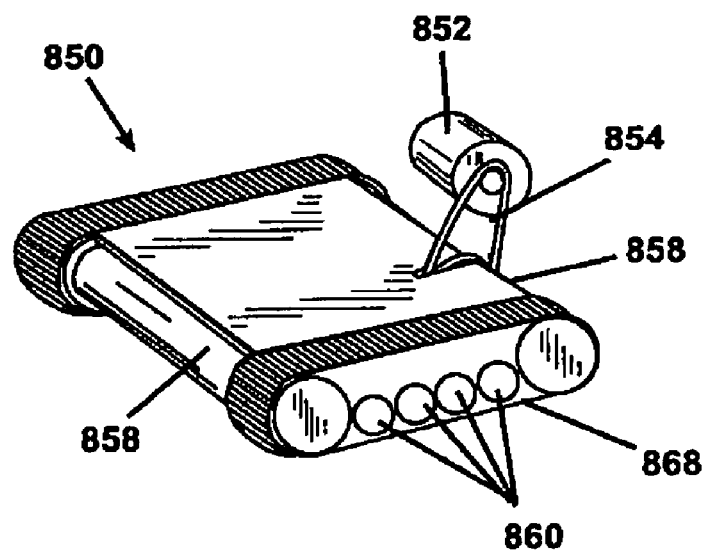
FIG. 17 is a schematic representation of a power drive for extraction cleaner according to a tenth embodiment of the invention.

Referring to FIG. 17, a track power drive assembly 850 is disclosed. The traction drive 134 comprises a track assembly 850 comprising a motor/transmission assembly 852 according to any of the previous embodiments operably connected to a drive belt 854. Drive belt 854 is reeved around a track sprocket 858, which is rotationally mounted on an underside of the extraction cleaner. At least one track 868 is mounted on a pair of track sprockets 858, and rides on a plurality of bearing track spindles 860.

Figure 18:
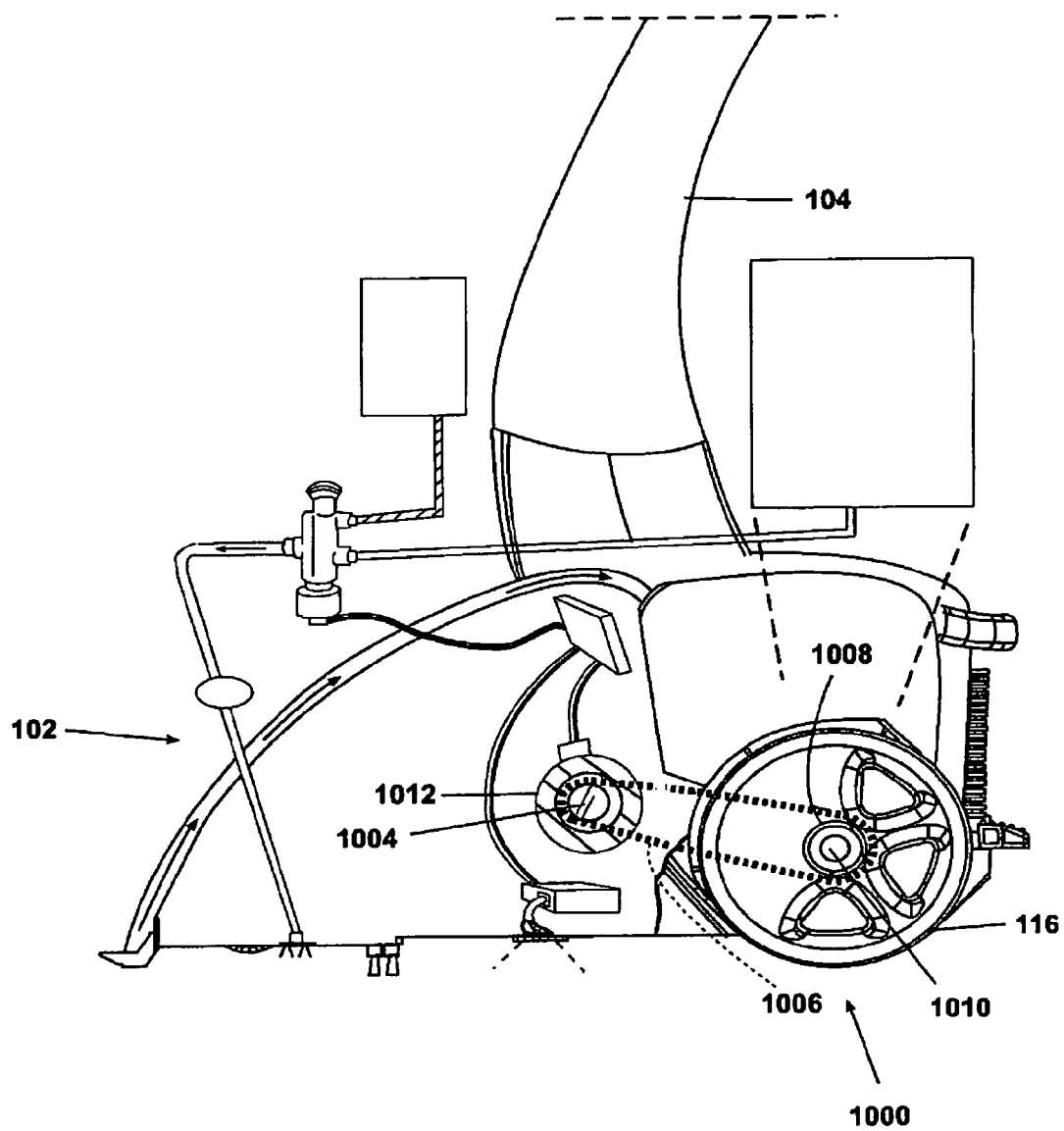
FIG. 18 is a schematic representation of a power drive for extraction cleaner according to an eleventh embodiment of the invention.

Referring to FIG. 18, an eleventh embodiment of a power drive 1000 is described in commonly owned U.S. patent application Ser. No. 09/593,126, filed Jun. 13, 2000, and entitled EXTRACTION GLEANING MACHINE WiTH CLEANING CONTROL, now U.S. Pat. No. 6,446,302, and is incorporated by reference. The base housing 102 houses a drive motor 1002 that is connected to a source of electricity by an electrical cord. A motor compartment (not shown) within the base housing 102 securely mounts the motor in place. While the motor 1002 as shown drives only rear wheels 116, the motor 1002 can also drive an agitation brush (not shown) for agitating debris from the surface being cleaned, as well as an impeller fan (not shown) to create a vacuum source for drawing dirt, debris, and fluid from the surface being cleaned.

The motor 1002 includes a motor drive shaft 1004, which includes a timing belt 1006 thereon for driving the rear wheels 116. Preferably, on the opposite side of the motor 1002, the motor drive shaft 1004 supports the impeller (not shown) within an impeller housing, which provides the vacuum source. With this configuration, a single drive motor 1002 is adapted to provide driving force for the impeller and the rear wheels 116. Alternatively, the motor 1002 can be used to drive only the rear wheels 116. Alternatively, the motor 1002 can drive the rear wheels, the impeller, and a fluid pump for providing cleaning solution to spray nozzles.

The timing belt 1006 is reeved around a first pulley 1008 mounted on a wheel axle 1010 for the rear wheels 116 and a second pulley 1012 on the drive shaft 1004 of the motor 1002. Preferably, the pulleys 1008, 1012 have toothed perimeters adapted for registration with the teeth in the timing belt 1006. The upright handle assembly 104 includes a U-shaped lower portion having opposed arms including cylindrical bearings for mounting the handle assembly 104 to the base housing and supporting the axle 1010 for rotatably mounting the wheels 116 to the extraction cleaner base housing 102. When the upright handle assembly is secured together, these arms pivot about the bearing integrally formed with the arms. The bearings, in turn, receive axle 1010, on each side, respectively, for mounting wheels 116. The axle 1010 is secured by large diameter axle mounting clips, disposed, when installed, adjacent the bearings and within the base module.

Once the handle assembly is mounted to the base housing 102, with the axle 1010 secured by the mounting clips, the extraction cleaner upper portion 106 is secured to the lower portion 108. The upper portion 106 also has an arcuate surface formed in a side thereof for accommodating and securing the integral bearings of the arms. Thus, the bearings of the arms are secured therebetween such that they can only rotate between an upright, stored position and an in-use position and the wheels are mounted to axle 1010 received through apertures in the bearings and secured by mounting clips.

While particular embodiments of the invention have been shown, it will be understood that the invention is not limited thereto. Reasonable variation and modification are possible within the scope of the foregoing disclosure and drawings, particularly in light of the foregoing teachings, without departing from the spirit of the invention which is defined in the appended claims.

The invention claimed is:

1. A surface cleaning apparatus having:
   a housing including a base and an upright handle pivotally mounted to the base for manipulation of the base along a surface to be cleaned;
   a suction cleaning system mounted to the housing and including:
      a recovery chamber;
      a suction nozzle;
      a working air conduit extending between the recovery chamber and the suction nozzle; and
      a vacuum source mounted to the housing and in fluid communication with the recovery chamber for generating a flow of working air from the suction nozzle through the working air conduit and to the recovery chamber to thereby draw dirty material from the surface to be cleaned through the suction nozzle and the working air conduit, and into the recovery chamber;
   the improvement which comprises:
      a traction driver mounted to the base for supporting the housing for movement along the surface to be cleaned; and
      a power drive assembly including an air drive turbine motor mounted to the housing and connected to the fraction driver for selectively propelling the base over the surface to be cleaned.

2. A surface cleaning apparatus according to claim 1 and further comprising a liquid dispensing system mounted to the housing and adapted to distribute liquid cleaning fluid onto the surface to be cleaned; and wherein the suction cleaning system is adapted to recover dirty liquid from the surface to be cleaned.

3. A surface cleaning apparatus having:
   a housing including a base and an upright handle pivotally mounted to the base for manipulation of the base along a surface to be cleaned;
   at least two wheels mounted to the base for supporting the housing for movement along the surface to be cleaned;
   a suction cleaning system mounted to the housing and including:
      a recovery chamber;
      a suction nozzle;
      a working air conduit extending between the recovery chamber and the suction nozzle; and
      a vacuum source mounted to the housing and in fluid communication with the recovery chamber for generating a flow of working air from the suction nozzle through the working air conduit and through the recovery chamber to thereby draw dirty material from the surface to be cleaned through the suction nozzle and the working air conduit, and into the recovery chamber;
   a drive motor comprising a unidirectional electric motor mounted on the housing;
   a transmission assembly operably connected between the drive motor and at least one of the wheels for selectively connecting the drive motor with the at least one wheel, the transmission assembly including a first gear train selectively connected between the drive motor and the at least one wheel for driving the base in a forward direction;
   a second gear train selectively connected between the drive motor and the at least one wheel for driving the base in a reverse direction;
   a clutch mechanism moveable between the first and second gear trains to alternately connect the first and second gear trains between the drive motor and the at least one wheel;
   a belt drive connecting the transmission assembly to the at least one wheel, the belt drive including a tension adjuster for maintaining a predetermined tension on the belt when the base is driven in the front and the rear directions;
   the handle having a grip mounted to an upper end thereof, the grip being slidably mounted on the upper end of the handle between an extended position, a neutral position and a retracted position;
   a drive actuator mounted on the grip portion and moveable therewith;
   a link between the grip and the clutch to move the clutch between the first gear train and the second gear train and to a neutral position between the two gear trains.

4. The surface cleaning apparatus according to claim 3 and further comprising a direct connection between the drive motor and the transmission assembly.

5. The surface cleaning apparatus according to claim 4 wherein the drive motor and the transmission assembly are both mounted to the upright handle.

6. The surface cleaning apparatus according to claim 3 wherein the drive motor and the transmission assembly are both mounted to the upright handle.

7. The surface cleaning apparatus according to claim 3 wherein the vacuum source includes a vacuum motor and the vacuum motor and the drive motor are independent of each other.

8. A surface cleaning apparatus according to claim 3 and further comprising a liquid dispensing system mounted to the housing and adapted to distribute liquid cleaning fluid onto the surface to be cleaned; and wherein the suction cleaning system is adapted to recover dirty liquid from the surface to be cleaned.

9. A surface cleaning apparatus having:
   a housing including a base and an upright handle pivotally mounted to the base for manipulation of the base along a surface to be cleaned;
   a suction cleaning system mounted to the housing and including a suction nozzle and a vacuum source, including a vacuum motor, in fluid communication with the suction nozzle to draw dirty material from the surface to be cleaned through the suction nozzle;
   a traction driver supporting the base for powered movement of the housing along the surface to be cleaned;
   a drive motor having an output shaft;
   a transmission assembly having a gear mounted to the drive motor outout shaft to provide a direct connection between the drive motor and the transmission assembly, all mounted to the housing, wherein the transmission assembly has an output shaft offset from and parallel to the drive motor output shaft connected to the traction driver for selectively propelling the base over the surface to be cleaned.

10. A surface cleaning apparatus having:
a housing including a base and an upright handle pivotally mounted to the base for manipulation of the base along a surface to be cleaned;
a handle grip slidably mounted on an upper end portion of the handle for axial movement along the handle between forward, neutral and rearward positions;
a suction cleaning system mounted to the housing and including a suction nozzle and a vacuum source, including a vacuum motor, in fluid communication with the suction nozzle to draw dirty material from the surface to be cleaned through the suction nozzle;
a fraction driver mounted to the base for powered movement of the housing along the surface to be cleaned;
a power drive assembly mounted to the housing and connected to the traction driver for selectively propelling the base over the surface to be cleaned in a forward and reverse direction;
a connection between the handle grip and the power drive assembly for controlling the direction of the propulsion of the base assembly in a forward, neutral or rearward position depending of the position of the handle grip in the forward, neutral and rearward positions, respectively; and
a lock including a rotatable knob mounted on the handle and accessible to the operator for selectively locking the handle grip in the neutral position.

11. The surface cleaning apparatus of claim 10 wherein the handle grip is biased to the neutral position for disablement of the power drive assembly.

12. A surface cleaning apparatus according to claim 10 and further comprising a liquid dispensing system mounted to the housing and adapted to distribute liquid cleaning fluid onto the surface to be cleaned; and wherein the suction cleaning system is adapted to recover dirty liquid from the surface to be cleaned.

13. A surface cleaning apparatus having:
a housing including a base and an upright handle pivotally mounted to the base for manipulation of the base along a surface to be cleaned;
a suction cleaning system mounted to the housing and including a suction nozzle and a vacuum source, including a vacuum motor, in fluid communication with the suction nozzle to draw dirty material from the surface to be cleaned through the suction nozzle;
a traction driver mounted to the base for powered movement of the housing along the surface to be cleaned;
a power drive assembly mounted to the housing and connected to the traction driver for selectively propelling the base over the surface to be cleaned;
a flywheel mounted for rotation about a central axis having a radial surface;
the traction driver is non-rotatably mounted on a drive axle and the drive axle is mounted for rotation about an axis parallel and adjacent to the flywheel radial surface; and
a drive wheel is axially shiftable and non rotatably mounted on the drive axle for rotation therewith, and the drive wheel has an outer circumferential surface that frictionally engages the radial surface of the fly wheel and is driven thereby to transfer rotary motion of the fly wheel to rotary motion of the drive axle;
wherein shifting of the drive wheel along the drive axle from one side of the radial surface to the another side changes the direction of rotation of the drive wheel.

14. The surface cleaning apparatus of claim 13 wherein the radial surface has a recessed area between the sides of the radial surface and drive wheel is adapted to be positioned in registry with the recessed area, out of contact with the radial surface to disconnect the flywheel from the drive wheel.

15. A surface cleaning apparatus according to claim 13 and further comprising a liquid dispensing system mounted to the housing and adapted to distribute liquid cleaning fluid onto the surface to be cleaned; and wherein, the suction cleaning system is adapted to recover dirty liquid from the surface to be cleaned.

16. A surface cleaning apparatus having:
a housing including a base and an upright handle pivotally mounted to the base for manipulation of the base along a surface to be cleaned;
a handle grip slidably mounted on an upper end portion of the handle for axial movement along the handle between forward, neutral and rearward positions;
a liquid dispensing system mounted to the housing and including a fluid supply chamber for holding a supply of cleaning fluid, a liquid dispenser and a fluid supply conduit, including a solution valve, between the liquid fluid supply chamber and the liquid dispenser for selectively applying cleaning fluid from the fluid supply chamber to the surface to be cleaned;
a fluid recovery system mounted to the housing and including a suction nozzle and a vacuum source in fluid communication with the suction nozzle to draw dirty liquid from the surface to be cleaned through the suction nozzle;
a traction driver mounted to the base for powered movement of the housing along the surface to be cleaned;
a power drive assembly mounted to the housing and connected to the traction driver for selectively propelling the base over the surface to be cleaned in a forward and reverse direction;
a connection between the handle grip and the power drive assembly for controlling the direction of the propulsion of the base in a forward, neutral or rearward position depending of the position of the handle grip in the forward, neutral and rearward positions, respectively;
wherein the connection between the handle grip and the power drive assembly includes a mounting block, slidable on the handle; and
the solution valve is mounted to the mounting block for movement therewith.

17. The surface cleaning apparatus of claim 16 and further comprising a cleaning solution actuator mounted on the handle grip and connected to the solution valve for selectively opening the solution valve to control the supply of cleaning fluid to the liquid dispenser.

18. A surface cleaning apparatus having:
a housing including a base and an upright handle pivotally mounted to the base for manipulation of the base along a surface to be cleaned;
a suction cleaning system mounted to the housing;
a traction driver supporting the base for movement along the surface to be cleaned;
a reversible electric drive motor mounted to the housing and having an output shaft coupled to the traction driver through a transmission that has a gear mounted to the drive motor output shaft and further has an output shaft parallel to and offset from the motor output shaft for selectively driving the traction driver in two directions; and a drive actuator on the handle operably connected to the drive motor for controlling the selective driving of the traction driver to propel the base over the surface to be cleaned.

19. A surface cleaning apparatus having:
a housing including a base and an upright handle pivotally mounted to the base for manipulation of the base along a surface to be cleaned;
a suction cleaning system mounted to the housing;
a traction driver mounted to the base for supporting the housing for movement along the surface to be cleaned;
an electric drive motor mounted to the housing and a transmission assembly operably connected between the electric drive motor and the traction driver to selectively drive the traction driver in two directions;
a drive actuator on the handle operably connected to the drive motor for controlling the selective driving of the traction driver to propel the base over the surface to be cleaned; and
wherein the transmission assembly comprises:
    a flywheel mounted for rotation about a central axis having a pair of parallel radial surfaces;
    the traction driver is non-rotatably mounted on a drive axle and the drive axle is mounted for rotation about an axis parallel and adjacent to one of the flywheel radial surfaces;
    a drive wheel is axially shiftable and non rotatably mounted on the drive axle for rotation therewith, and the drive wheel has an outer circumferential surface that rolls along one of the radial surfaces of the fly wheel to transfer rotary motion of the fly wheel to rotary motion of the drive axle;
    wherein shifting of the drive wheel along the drive axle changes the gear ratio between the fly wheel and the drive wheel.

20. The surface cleaning apparatus of claim 19 wherein a projection of the drive axle onto the one of the radial surfaces of the flywheel defines a diametrical line across the flywheel and the drive wheel contact with the flywheel is along the diametrical line, whereby axial shifting of the drive wheel along the drive axle changes the gear ratio and can also change the direction of rotation of the drive axle.

21. The surface cleaning apparatus of claim 20 and further comprising a worm gear driven by the motor and wherein the flywheel has an outer circumferential gear edge that is driven by the worm gear.

22. A surface cleaning apparatus according to claim 19 and further comprising a liquid dispensing system mounted to the housing and adapted to distribute liquid cleaning fluid onto the surface to be cleaned; and wherein the suction cleaning system is adapted to recover dirty liquid from the surface to be cleaned.

23. A surface cleaning apparatus having:
a housing including a base and an upright handle pivotally mounted to the base for manipulation of the base along a surface to be cleaned;
a suction cleaning system mounted to the housing;
a traction driver mounted to the base for supporting the housing for movement along the surface to be cleaned;
an electric drive motor mounted to the housing and a transmission assembly operably connected between the electric drive motor and the traction driver to selectively drive the traction driver in two directions, wherein the transmission assembly is connected to the traction driver through a belt;
a belt tensioner assembly mounted to the housing to maintain tension on the belt in each of the two directions, and
a drive actuator on the handle operably connected to the drive motor for controlling the selective driving of the traction driver to propel the base over the surface to be cleaned.

24. The surface cleaning apparatus of claim 23 wherein the belt tensioner assembly comprises a plate slidably mounted to the housing, a pair of wheels rotatably mounted on the plate and the belt is weaved between the wheels so that proper tension is maintained when the belt is driven in either direction.

25. A surface cleaning apparatus according to claim 23 and further comprising a liquid dispensing system mounted to the housing and adapted to distribute liquid cleaning fluid onto the surface to be cleaned; and wherein the suction cleaning system is adapted to recover dirty liquid from the surface to be cleaned.

26. A surface cleaning apparatus having:
a housing including a base and an upright handle pivotally mounted to the base for manipulation of the base along a surface to be cleaned;
a suction cleaning system mounted to the housing;
a traction driver mounted to the base for supporting the housing for movement along the surface to be cleaned;
a drive motor mounted to the housing and connected to the traction driver through a flexible cable in driving relationship therewith for selectively propelling the base over the surface to be cleaned.

27. A surface cleaning apparatus according to claim 26 and further comprising a liquid dispensing system mounted to the housing and adapted to distribute liquid cleaning fluid onto the surface to be cleaned; and wherein the suction cleaning system is adapted to recover dirty liquid from the surface to be cleaned.

28. A surface cleaning apparatus having:
a housing including a base and an upright handle pivotally mounted to the base for manipulation of the base along a surface to be cleaned;
a suction cleaning system mounted to the housing;
a traction driver mounted to the base for supporting the housing for movement along the surface to be cleaned;
a wheel sprocket non-rotatably connected to the traction driver for movement therewith; and
a drive motor mounted on the housing in driving relationship with the wheel sprocket for selectively propelling the base over the surface to be cleaned.

29. The surface cleaning apparatus according to claim 28 wherein the drive motor is mounted to the handle and further comprising a belt operably connected to the drive motor and the wheel sprocket for driving the traction driver.

30. A surface cleaning apparatus according to claim 28 and further comprising a liquid dispensing system mounted to the housing and adapted to distribute liquid cleaning fluid onto the surface to be cleaned; and wherein the suction cleaning system is adapted to recover dirty liquid from the surface to be cleaned.

31. A surface cleaning apparatus having:
a housing including a base and an upright handle pivotally mounted to the base for manipulation of the base along a surface to be cleaned;
a suction cleaning system mounted to the housing;
a traction driver mounted to the base for supporting the housing for movement along the surface to be cleaned and comprising a drive brush mounted for rotation about a horizontal axis on the base;
a sprocket non-rotatably mounted to the drive brush;
a drive motor mounted to the housing; and
a belt drive between the motor and the sprocket for driving the drive brush;
wherein rotation of the drive brush results in movement of the base across the surface to be cleaned and selectively propels the base over the surface to be cleaned.

32. A surface cleaning apparatus according to claim 31 and further comprising a liquid dispensing system mounted to the housing and adapted to distribute liquid cleaning fluid onto the surface to be cleaned; and wherein the suction cleaning system is adapted to recover dirty liquid from the surface to be cleaned.

33. A surface cleaning apparatus having:
a housing including a base and an upright handle pivotally mounted to the base for manipulation of the base along a surface to be cleaned;
a suction cleaning system mounted to the housing;
a traction driver mounted to the base for supporting the housing for movement along the surface to be cleaned and comprising a track assembly including:
a pair of track sprockets mounted on the base for rotation about parallel, horizontally spaced axes; and
at least one track belt reeved around the track sprockets and in contact with a surface to be cleaned; and
a drive motor mounted on the housing and operably connected to one of the track sprockets for selectively driving the same for selectively propelling the base over the surface to be cleaned.

34. A surface cleaning apparatus according to claim 33 and further comprising a liquid dispensing system mounted to the housing and adapted to distribute liquid cleaning fluid onto the surface to be cleaned; and wherein the suction cleaning system is adapted to recover dirty liquid from the surface to be cleaned.

35. A surface cleaning apparatus having:
a housing including a base and an upright handle pivotally mounted to the base for manipulation of the base along a surface to be cleaned;
a suction cleaning system mounted to the housing;
a traction driver mounted to the base for supporting the housing for movement along the surface to be cleaned;
a power drive assembly mounted to the housing and connected to the traction driver for selectively propelling the base over the surface to be cleaned;
wherein the power drive assembly includes a handle grip slidably mounted on an upper end portion of the handle for axial movement along the handle between forward and rearward positions for selectively controlling the movement of the base in a forward and reverse direction over the surface to be cleaned; and
wherein the handle grip is biased to a neutral position between the forward and rearward positions for disablement of the power drive assembly when the handle is in a reclining position.

36. The surface cleaning apparatus of claim 35 and further comprising a liquid dispensing system mounted to the housing and including:
a liquid dispenser for applying liquid to the surface to be cleaned;
a fluid supply chamber for holding a supply of cleaning fluid;
a fluid supply conduit fluidly connected to the fluid supply chamber and to the liquid dispenser for supplying fluid to the dispenser.
wherein the drive actuator further comprises a mounting block slidable on the handle and further comprising a solution valve mechanism in the fluid supply conduit mounted to the sliding block for movement therewith.

37. The surface cleaning apparatus of claim 36 and further comprising a solution valve actuator mounted to the handle grip and connected to the solution valve mechanism to control the flow of cleaning fluid through the solution valve mechanism to the liquid dispenser from the fluid supply chamber.

38. The surface cleaning apparatus of claim 35 and further comprising a lock for selectively locking the handle grip in the neutral position when the handle is in a reclining position.

39. The surface cleaning apparatus of claim 38 wherein the lock comprises an aperture in the handle grip and an aperture in the upper end portion of the handle and apertures aligned with each other when the handle grip is in the neutral position; and
a pin selectively moveable between a locked position wherein the pin is positioned within both of the apertures and an unlocked position wherein the pin is retracted from at least one of the two apertures.

40. The surface cleaning apparatus of claim 35 and further comprising a carry handle affixed to the upright handle.

41. A surface cleaning apparatus according to claim 35 and further comprising a liquid dispensing system mounted to the housing and adapted to distribute liquid cleaning fluid onto the surface to be cleaned; and wherein the suction cleaning system is adapted to recover dirty liquid from the surface to be cleaned.

\* \* \* \* \*

UNITED STATES PATENT AND TRADEMARK OFFICE
CERTIFICATE OF CORRECTION

PATENT NO. : 7,062,816 B2  Page 1 of 1
APPLICATION NO. : 10/064723
DATED : June 20, 2006
INVENTOR(S) : Kasper et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (319) days Delete the phrase "by 319" and insert -- by 404 days--

Signed and Sealed this

Twenty-ninth Day of May, 2007

JON W. DUDAS
*Director of the United States Patent and Trademark Office*